(12) United States Patent
Dally et al.

(10) Patent No.: US 12,731,019 B2
(45) Date of Patent: Sep. 8, 2026

(54) ASYNCHRONOUS ACCUMULATOR USING LOGARITHMIC-BASED ARITHMETIC

(71) Applicant: NVIDIA Corporation, Santa Clara, CA (US)

(72) Inventors: William James Dally, Incline Village, NV (US); Rangharajan Venkatesan, San Jose, CA (US); Brucek Kurdo Khailany, Austin, TX (US); Stephen G. Tell, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 228 days.

(21) Appl. No.: 18/674,632

(22) Filed: May 24, 2024

(65) Prior Publication Data

US 2024/0311626 A1 Sep. 19, 2024

Related U.S. Application Data

(63) Continuation of application No. 16/750,917, filed on Jan. 23, 2020, now Pat. No. 12,033,060, which is a (Continued)

(51) Int. Cl.
*G06N 3/063* (2023.01)
*G06F 7/544* (2006.01)
(Continued)

(52) U.S. Cl.
CPC ............ *G06N 3/063* (2013.01); *G06F 7/575* (2013.01); *G06F 17/16* (2013.01); *G06N 3/02* (2013.01); *G06F 7/5443* (2013.01); *G06N 3/045* (2023.01)

(58) Field of Classification Search
CPC ............................ G06N 3/063; G06N 7/575
See application file for complete search history.

(56) References Cited

U.S. PATENT DOCUMENTS

| | | | |
|---|---|---|---|
| 5,944,774 | A | 8/1999 | Dent |
| 9,496,917 | B2 | 11/2016 | Germain et al. |

(Continued)

FOREIGN PATENT DOCUMENTS

| | | | |
|---|---|---|---|
| CN | 107368286 | A | 11/2017 |
| WO | 2013095338 | A1 | 6/2013 |

OTHER PUBLICATIONS

Neshatian, K., et al., "Filter Approach to Multiple Feature Construction for Symbolic Learning Classifiers Using Genetic Programming," IEEE Transactions on Evolutionary Computation, vol. 16, No. 5, Oct. 2012.

(Continued)

*Primary Examiner* — Michael D. Yaary
(74) *Attorney, Agent, or Firm* — Leydig, Voit & Mayer, Ltd.

(57) ABSTRACT

Neural networks, in many cases, include convolution layers that are configured to perform many convolution operations that require multiplication and addition operations. Compared with performing multiplication on integer, fixed-point, or floating-point format values, performing multiplication on logarithmic format values is straightforward and energy efficient as the exponents are simply added. However, performing addition on logarithmic format values is more complex. Conventionally, addition is performed by converting the logarithmic format values to integers, computing the sum, and then converting the sum back into the logarithmic format. Instead, logarithmic format values may be added by decomposing the exponents into separate quotient and remainder components, sorting the quotient components based on the remainder components, summing the sorted quotient components using an asynchronous accumulator to produce partial sums, and multiplying the partial sums by (Continued)

the remainder components to produce a sum. The sum may then be converted back into the logarithmic format.

20 Claims, 27 Drawing Sheets

Related U.S. Application Data continuation-in-part of application No. 16/549,683, filed on Aug. 23, 2019, now Pat. No. 11,886,980.

(51) Int. Cl.

| | |
|---|---|
| ***G06F 7/575*** | (2006.01) |
| ***G06F 17/16*** | (2006.01) |
| ***G06N 3/02*** | (2006.01) |
| ***G06N 3/045*** | (2023.01) |

(56) References Cited

U.S. PATENT DOCUMENTS

| | | | | |
|---|---|---|---|---|
| 2006/0097902 | A1 | 5/2006 | Muramatsu et al. | |
| 2009/0089348 | A1 | 4/2009 | Bolotski et al. | |
| 2019/0164043 | A1 | 5/2019 | Litvak et al. | |
| 2020/0073912 | A1 | 3/2020 | Hiroi et al. | |
| 2020/0293867 | A1 | 9/2020 | Shao et al. | |
| 2020/0310758 | A1* | 10/2020 | Desoli | G06N 3/04 |
| 2021/0056397 | A1 | 2/2021 | Dally et al. | |
| 2021/0256363 | A1 | 8/2021 | Nair et al. | |

OTHER PUBLICATIONS

Meher, M., et al., “A High Bit Rate Serial-Serial Multiplier With On-The-Fly Accumulation by Asynchronous Counters,” IEEE Trans. Very Large Scale Integr. (VLSI) Syst., vol. 19, No. 10, Oct. 2011, pp. 1722-1745.

Hennessy, J.L., et al., Computer Architecture, Fifth Edition: A Quantitative Approach, 5th ed. San Francisco, CA USA, Morgan Kaufmann Publishers, Inc. 2011.

Hennessy, J.L., et al., Computer Architecture: A Quantitative Approach, 2003, Elsevier Science and Technology, 3rd Ed. pp. 609-611, Retrieved from ProQuest Ebook Central, 2014.

Marston, R., “Up and up/down counters,” in CMOS Circuits Manual, London: Heinemann, 1987, ch. 8, pp. 133-151.

Sze, V., Efficient Processing of Deep Neural Networks: from Algorithms to Hardward Architectures (PowerPoint Slides), Available: https://eyeriss.mit.edu/2019_neurips_tutorial.pdf (2019).

Chen, Y., et al., “Eyeriss: A Spatial Architecture for Energy-Efficient Dataflow for Convolutional Neural Networks,” In 2016 ACM/IEEE 43rd Annual International Symposium on Computer Architecture (ISCA), 2016, pp. 367-379.

J. N. Mitchell, “Computer Multiplication and Division Using Binary Logarithms,” in IRE Transactions on Electronic Computers, vol. EC-11, No. 4, pp. 512-517, Aug. 1962.

M. S. Kim, A. A. D. Barrio, L. T. Oliveira, R. Hermida and N. Bagherzadeh, “Efficient Mitchell’s Approximate Log Multipliers for Convolutional Neural Networks,” in IEEE Transactions on Computers, vol. 68, No. 5, pp. 660-675, May 1, 2019.

Daisuke Miyashita, Edward H Lee, and Boris Murmann. Convolutional neural networks using logarithmic data representation. arXiv preprint arXiv:1603.01025, 2016.

E. H. Lee, D. Miyashita, E. Chai, B. Murmann and S. S. Wong, “LogNet: Energy-efficient neural networks using logarithmic computation,” 2017 IEEE International Conference on Acoustics, Speech and Signal Processing (ICASSP), New Orleans, LA, 2017, pp. 5900-5904.

J. Johnson, “Rethinking floating point for deep learning,” arXiv preprint arXiv:1811.01721, 2018.

M. Chugh and B. Parhami, “Logarithmic arithmetic as an alternative to floating-point: A review,” 2013 Asilomar Conference on Signals, Systems and Computers, Pacific Grove, CA, 2013, pp. 1139-1143.

* cited by examiner

ASYNCHRONOUS ACCUMULATOR USING LOGARITHMIC-BASED ARITHMETIC

CLAIM OF PRIORITY

This application is a continuation of U.S. application Ser. No. 16/750,917 titled "Asynchronous Accumulator Using Logarithmic-Based Arithmetic," filed Jan. 23, 2020 which is a continuation-in-part of U.S. application Ser. No. 16/549,683 titled "Neural Network Accelerator Using Logarithmic-Based Arithmetic," filed Aug. 23, 2019, now U.S. Pat. No. 11,886,980 issued Jan. 20, 2024, the entire contents of which are incorporated herein by reference.

TECHNICAL FIELD

The present disclosure relates to asynchronous accumulation, and, more specifically, to asynchronous accumulation using logarithmic-based arithmetic.

BACKGROUND

Performing accurate dot product calculations or other operations, such as a multiply-accumulate operation that requires computing a sum of products, can be expensive in terms of energy when implemented in circuitry. As the number of bits used to represent each value increases, more energy and/or time is needed to complete the calculation and produce an accurate result. There is a need for addressing these issues and/or other issues associated with the prior art.

SUMMARY

Neural networks, in many cases, include convolution layers that are configured to perform many convolution operations that include the performance of multiplication operations to generate products that are subsequently summed to produce a result. Compared with performing multiplication on integer, fixed-point, or floating-point format values, performing multiplication on logarithmic format values is straightforward and energy efficient as the exponents are simply added. However, adding logarithmic format values is more complex. Conventionally, addition is performed by converting the logarithmic format values to integers, computing the sum, and then converting the sum back into the logarithmic format. Instead, logarithmic format values may be added by decomposing the exponents into separate quotient and remainder components, sorting the quotient components based on the remainder components, summing the sorted quotient components using an asynchronous accumulator to produce partial sums, and multiplying the partial sums by the remainder components to produce a sum of the logarithmic format values in integer format. The sum may then be converted back into the logarithmic format.

A method and system are disclosed for asynchronous accumulation using logarithmic-based arithmetic. A bit selection input specifying a single bit position j of t bit positions within an asynchronous accumulator circuit is received. In response to receiving the bit selection input, $2^j$ is summed with a sum output of the asynchronous accumulator circuit to produce a result that is stored in the asynchronous accumulator circuit as the sum output.

DETAILED DESCRIPTION

Numbers may be represented in a logarithmic format, where a value v is encoded as a sign bit s=sign(v) and an exponent field $e=\log_b(v)$. For binary numbers, the logarithmic format has the advantage of having a maximum quantization error that is proportional to the magnitude of the number being represented. The maximum quantization error is determined by the number of bits used to perform an arithmetic computation. Reducing the number of bits increases the quantization error and also usually reduces the energy (e.g. power) consumed by circuitry performing the arithmetic computation. When integers are used to represent numbers, the relative quantization error is not uniform across the range of values. Instead, the relative quantization error increases as the magnitude of the number decreases. Therefore, a logarithmic representation is particularly advantageous when values having small magnitudes are accumulated because the quantization error will be reduced.

Multiplying logarithmic numbers is straightforward. To multiply $(s_1, e_1)$ and $(s_2, e_2)$, the product $(s_p, e_p)$ is computed as:

$$s_p = s_1 \oplus s_2$$

$$e_p = e_1 + e_2$$

Adding two numbers $(s_1, e_1)+(s_2, e_2)$ generally requires converting to an integer representation, performing the addition operation and then converting the sum back into the logarithmic format. However, restricting the logarithmic format can simplify the addition operation.

When the base of the logarithmic format is restricted to be of the form $b=2^{1/n}$ for an integer n, the value $v=s2^{e/n}$. The exponent can be decomposed or separated into an integer quotient component $e_q$ and a remainder component $e_r$, so that $$v = s2^{\left(e_q + \frac{e_r}{n}\right)}, \text{ where } e_q = \text{floor}\left(\frac{e}{n}\right) \text{ and } e_r = e - e_q n.$$

When n is a power of 2, the least-significant bits of the exponent are the remainder component and the most-significant bits of the exponent are the quotient component. When a neural network model is configured for inferencing, many of the inputs to the convolutional layers are small values that may be represented in a logarithmic format using n=4, 8, or 16 while maintaining an accuracy equivalent or better compared with an integer format represented using eight bits.

Figure 1A:
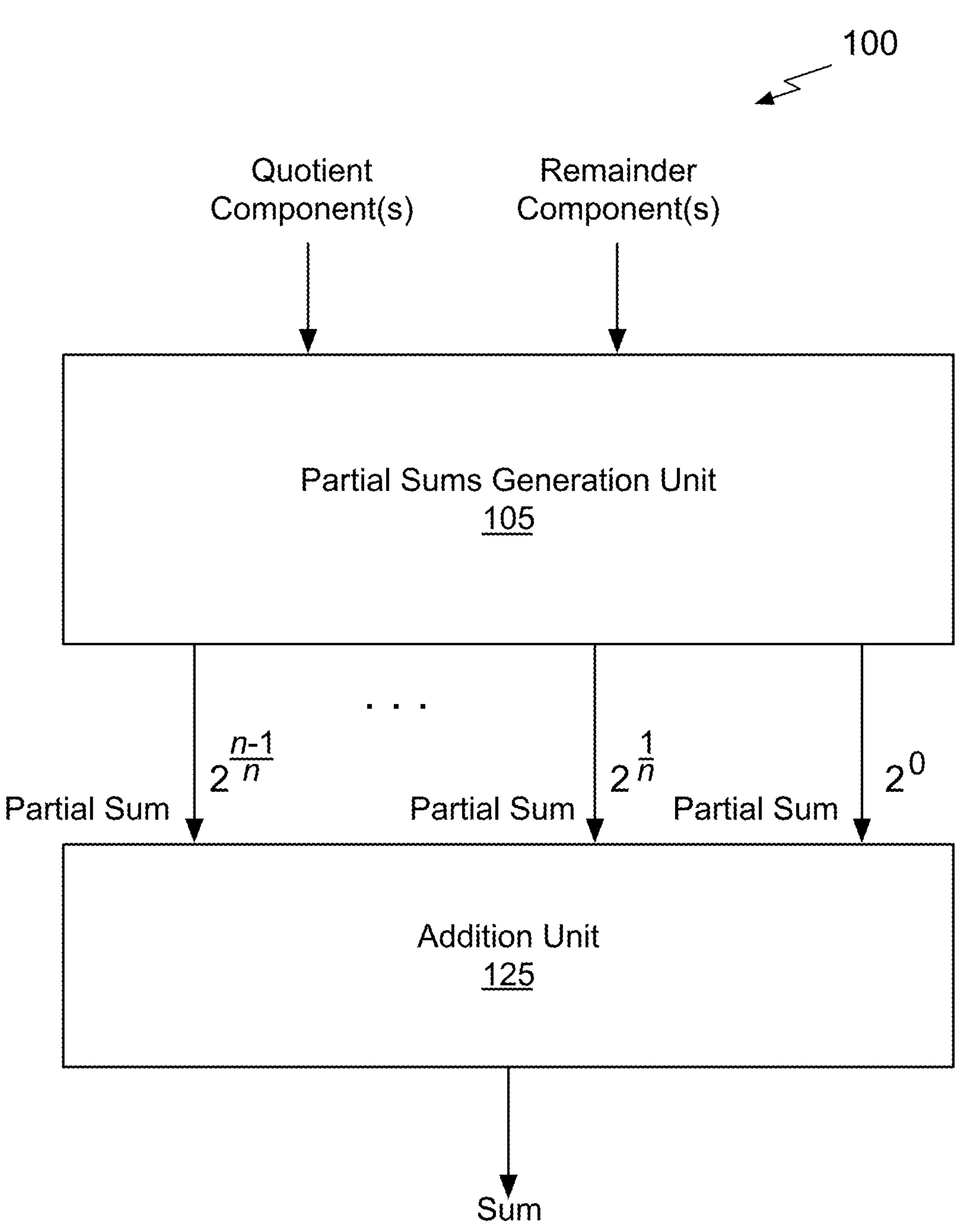
FIG. 1A illustrates a block diagram of a system for accumulating input values represented in a logarithmic format, in accordance with an embodiment.

FIG. 1A illustrates a block diagram of a system 100 for accumulating input values represented in a logarithmic format, in accordance with an embodiment. The system 100 includes a partial sums generation unit 105 and an addition unit 125. Decomposing each input value in the logarithmic format into a quotient component $e_q$ and a remainder component $e_r$ enables an inexpensive conversion of the input values to an integer representation for accumulation to compute the sum of a series of numbers. The quotient and remainder components of the input values in the logarithmic format are processed by the partial sums generation unit 105 to produce partial sums. The addition unit 125 adds the partial sums together to produce the sum of the input values.

Conventionally, to convert the input values into integer format before summing the input values, each contribution of a quotient component for an input value is scaled by the remainder component for the input value. The scaled contributions are then accumulated to produce the sum. Even though multiplying the remainder components and quotient components can be accomplished by a shift operation, eliminating the shift operation for every input value reduces energy consumption, especially when the number of input values is large. The scaled contributions should be represented by a number of bits sufficient to prevent the approximation error from being large compared to the quantization error of the logarithmic format. Another drawback of the conventional technique is that, during the conversion and accumulation operations, many of the bits toggle, thereby consuming energy.

In contrast with the conventional technique, the required work to compute the sum of a series of numbers can be reduced by computing separate partial sums for each possible value of the remainder component. When separate partial sums are computed for each possible value of the remainder component, the numbers being summed have only a single bit set to "one" and, with the average carry propagation being one bit position, very few bits toggle to compute the separate partial sums. Therefore, energy consumption is reduced compared with the conventional technique.

The partial sums generation unit 105 defers scaling by the remainder components and instead sorts the contributions of quotient components according to the remainder components and accumulates the contributions separately. Therefore, instead of a single large accumulator, multiple accumulators are used and an n-way accumulation of the partial sums is performed once for each sum. For each possible value of the remainder components, a partial sum of the contributions for the quotient components is accumulated by one of the smaller accumulators within the partial sums generation unit 105. The number of possible remainder component values equals n. In an embodiment, n=4, 8, or 16. When n=8, the possible values of the remainder components are constants $2^0$, $2^{1/8}$, $2^{1/4}$, $2^{3/8}$, $2^{1/2}$, $2^{5/8}$, $2^{3/4}$, and $2^{7/8}$. Therefore, when n=8, eight partial sums are accumulated within the partial sums generation unit 105. The contribution for each quotient component is a leading-one left-shifted by $e_q$ (e.g., $1<<e_q$). Compared with the conventional technique, the shift operation performed for every input value used in the conventional technique is replaced with n multiplication operations, performed only once after the n partial sums are computed.

Described another way, the contributions for the quotient components are separately accumulated in buckets, where each bucket corresponds to a different remainder component value. The partial sums generation unit 105 distributes the quotient components to buckets according to the remainder components. After the quotient component contributions are accumulated in each bucket for all of the input values, the sum in each bucket is multiplied by the corresponding remainder component value (e.g., one of the constants) to produce the partial sums that are output by the partial sums generation unit 105. The partial sums are then summed by the addition unit 125 to produce the result (sum) in integer (linear) format.

In an embodiment, to reduce toggling bits during the accumulation of the quotient contributions, the quotient contributions for positive input values (the sign s is positive) are accumulated separately from the quotient contributions for negative input values. Separate accumulation produces n positive partial sums and n negative partial sums that are summed by the addition unit 125 to produce the result. In an embodiment, the negative partial sums are represented as positive numbers during accumulation and then converted into negative numbers represented in twos complement format before being input to the addition unit 125.

Although the system 100 is described in the context of processing units, one or more of the partial sums generation unit 105 and the addition unit 125 may be implemented as a program, custom circuitry, or by a combination of custom circuitry and a program. For example, the partial sums generation unit 105 may be implemented by a GPU (graphics processing unit), CPU (central processing unit), or any processor capable of implementing layers of a neural network. Furthermore, persons of ordinary skill in the art will understand that any system that performs the operations of the system 100 is within the scope and spirit of embodiments of the present disclosure.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
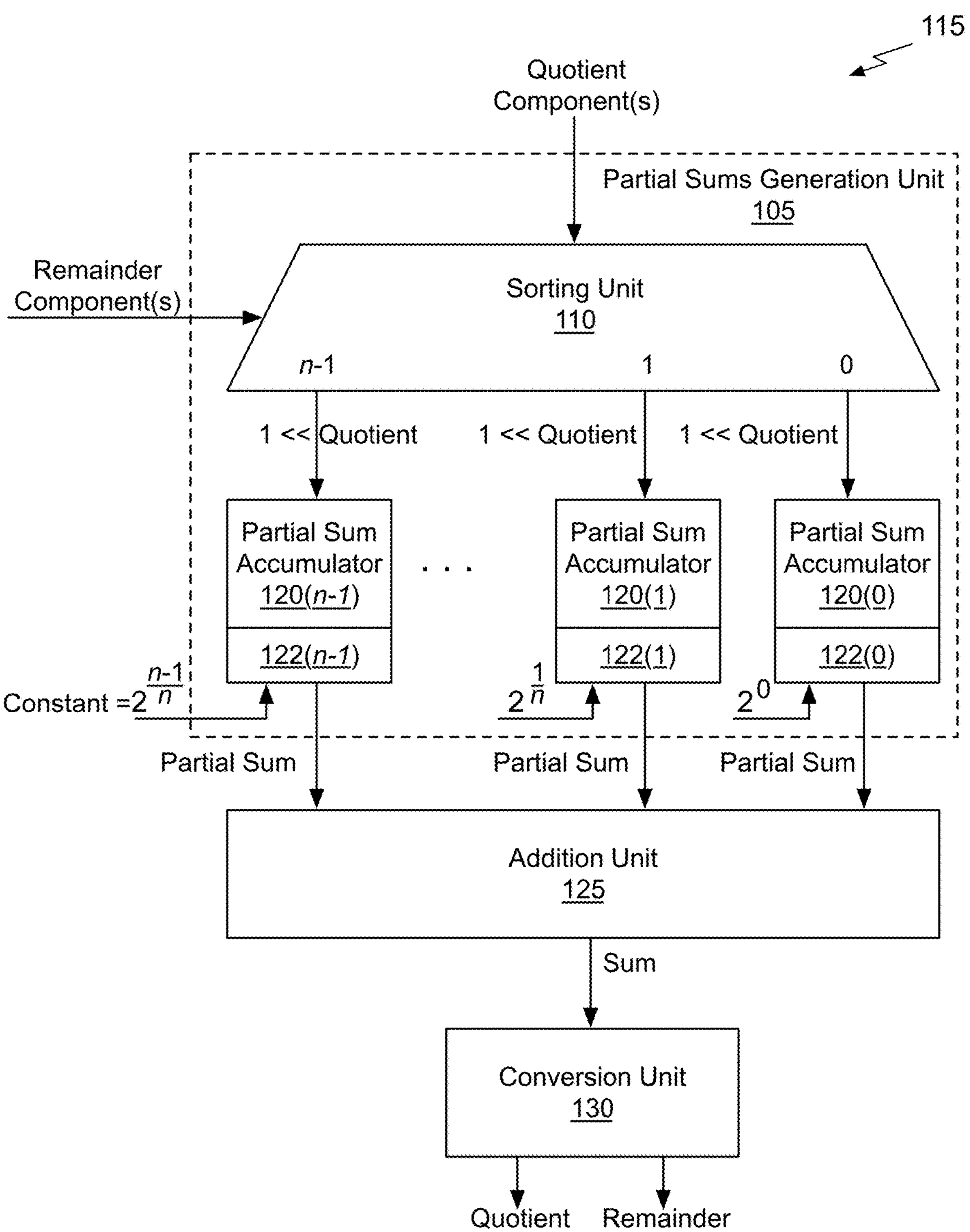
FIG. 1B illustrates another block diagram of the system for accumulating input values represented in a logarithmic format, in accordance with an embodiment.

FIG. 1B illustrates another block diagram of a system 115 for accumulating values represented in a logarithmic format, in accordance with an embodiment. The system 115 includes the partial sums generation unit 105, the addition unit 125, and a conversion unit 130. As shown in FIG. 1B, a sorting unit 110 within the partial sums generation unit 105 distributes each quotient component for an input value to one of the partial sum accumulators 120 (buckets) according to the remainder component for the input value. Because there are n possible values of the remainder component, the quotient components are routed into n separate partial sum accumulators 120 to generate the set of partial sums. In an embodiment, the sorting unit 110 is implemented in circuitry as an n-way demultiplexer.

When the quotient component for an input value is sorted, a binary one is shifted left by the quotient component to produce a quotient contribution ($1 \ll e_q$) that is routed to one of the partial sum accumulators 120 according to the remainder component $e_r$ for the input value. In an embodiment, the left-shift operation is implemented as a combinational shifter.

One of the n partial sum accumulators 120 is enabled or selected by the remainder component for each input value. For example, using n=8, for a first input value with $e_q$=4'b0010 (integer number 2) and $e_r$=3'b100 (integer number 4), a first quotient contribution, $1 \ll e_q$=4'b0100 is routed to the partial sum accumulator 120(4). When a second input value with $e_q$=4'b0011 (integer number 3) and $e_r$=3'b100 (integer number 4) is received, a second quotient contribution, $1 \ll e_q$=4'b1000 is routed to the partial sum accumulator 120(4). The first quotient contribution and the second quotient contribution are summed by the partial sum accumulator 120(4) to produce a partial sum. Note, when n separate partial sum accumulators 120 are accumulated to produce the partial sums, the quotient contributions being summed have only a single bit set to a one and, because the average carry propagation is one bit position, very few bits toggle within each selected partial sum accumulator 120 to compute the separate partial sums. In an embodiment, each partial sum accumulator 120 is implemented as a carry-propagate adder circuit.

The quotient component for each input value may be sorted serially, with one of the partial sum accumulators 120 receiving a contribution for each input value. When the quotient components and remainder components for the input values are available simultaneously, the quotient components may be sorted in parallel. The contributions for the quotient components may be accumulated serially or, if the partial sum accumulators 120 are configured to accumulate multiple input values, at least a portion of the contributions may be accumulated in parallel by the partial sum accumulators 120.

After all of the input values are processed by the sorting unit 110 and the contributions for the quotient components are accumulated by the partial sum accumulators 120, each partial sum is scaled by a respective constant (remainder component) to produce the set of partial sums for output to the addition unit 125. As shown in FIG. 1B, a multiplier 122 scales the output of each partial sum accumulator 120 by a respective constant to produce the set of partial sums. The constant is included in n constants $c_i=2^{i/n}$ for $i \in \{0 \ldots n-1\}$ and the remainder component determines the constant by which each partial sum is scaled. In other words, each of the n constants corresponds to a particular partial sum accumulator 120 that produced the partial sum associated with the constant. For example, when n=8 the partial sum accumulated in the partial sum accumulator 120(4) is scaled by the constant $2^{1/2}$, thereby scaling all of the quotient contributions associated with $e_r$=3'b100 by $2^{1/2}$. The quotient components effectively determine the amount by which the corresponding constant is shifted.

The set of partial sums are summed by the addition unit 125 to produce the result (sum) in integer format. In an embodiment, the addition unit 125 is implemented as a carry-propagate adder circuit. The sum is converted to logarithmic format by the conversion unit 130. Conventionally, conversion from integer to logarithmic format generally requires taking the logarithm which can be an expensive process. However, by restricting the choice of the logarithmic base b to be $b=2^{1/n}$ for n a power of 2, the conversion performed by conversion unit 130 is much simpler.

Given an integer m, the position of the leftmost (e.g., leading) 1 in m is determined by the conversion unit 130. The position is the quotient component of e, namely $e_q$. Then, the conversion unit 130 shifts m so that the leading 1 is in the leftmost bit (i.e., the leading zeros are removed) producing an aligned m. In an embodiment, the conversion unit 130 compares the aligned m to the n possible remainder values (constants) $c_i=2^{i/n}$, to determine the remainder component of e, namely $e_r$. The constant closest to the aligned bits of m determines the $e_r$. In another embodiment, the aligned m is input to a look-up table to determine the remainder component $e_r$. In yet another embodiment, a tree traversal is performed to successively compare the aligned m to a subset of constants to determine the remainder component $e_r$.

To find the closest constant, conversion unit 130 may compare the aligned m with the (n−1) midpoints $d_i$ between the constants, where $$d_i = \frac{c_i + c_{i+1}}{2}.$$

The n−1 comparisons can be performed in parallel. The conversion unit 130 examines each comparison result to find the transition from 0 to 1. In another embodiment, the conversion unit 130 performs a binary search of the aligned m with the midpoints, requiring $\log_2 n$ comparisons to find the closest constant. When converting the integer format sum back to logarithmic format after a long summation—as may be performed within a neural network—the conversion latency is not critical, because only one conversion is typically performed for thousands of multiplication and addition operations.

Figure 1C:
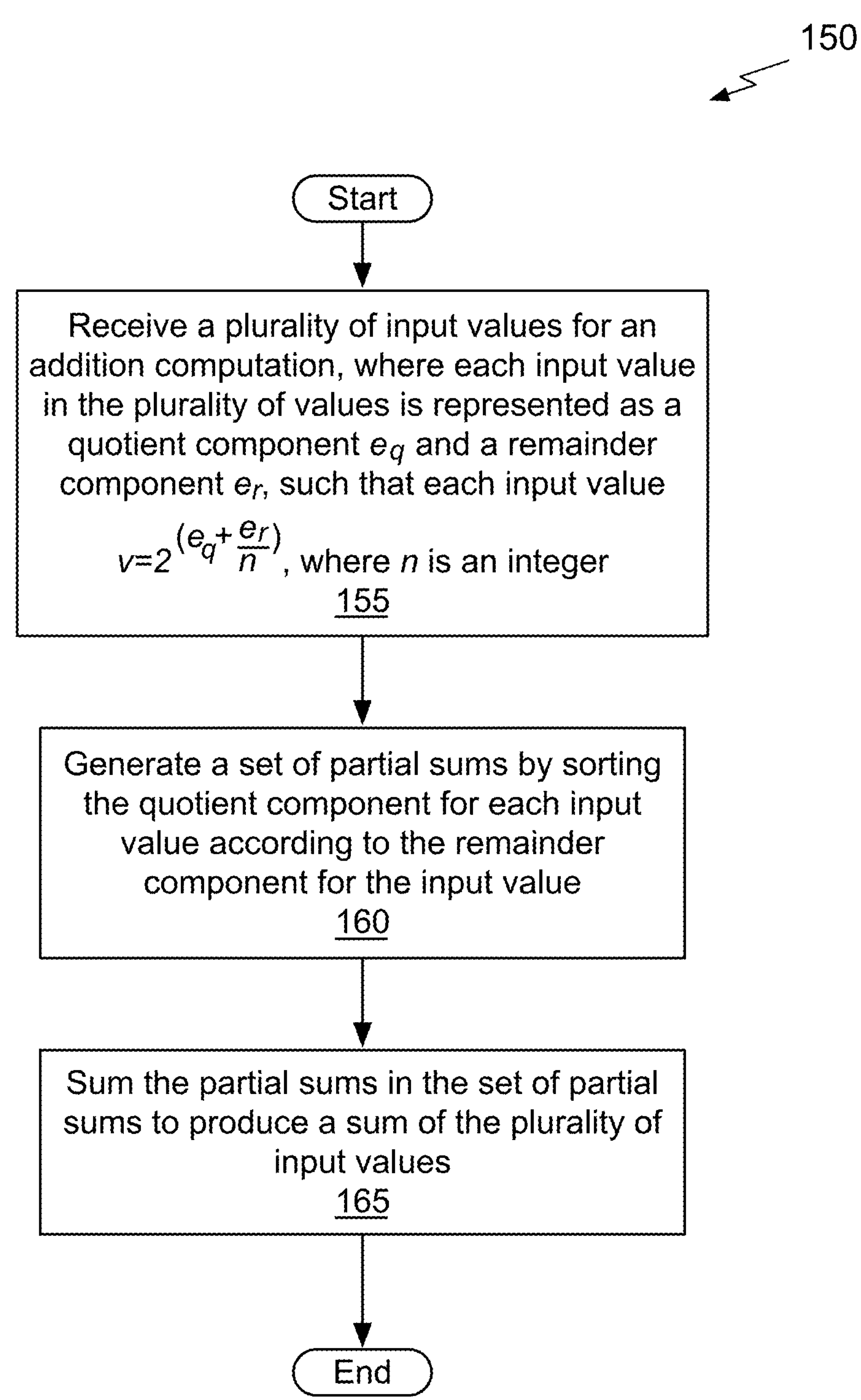
FIG. 1C illustrates a flowchart of a method for accumulating input values represented in a logarithmic format, in accordance with an embodiment.

FIG. 1C illustrates a flowchart of a method 150 for accumulating values represented in a logarithmic format, in accordance with an embodiment. Although method 150 is described in the context of a processing unit, the method 150 may also be performed by a program, custom circuitry, or by a combination of custom circuitry and a program. For example, the method 150 may be executed by a GPU (graphics processing unit), CPU (central processing unit), or any processor capable of computing the sum, such as the system 100 or 115. Furthermore, persons of ordinary skill in the art will understand that any system that performs method 150 is within the scope and spirit of embodiments of the present disclosure.

At step 155, a plurality of input values is received for an addition computation. Each input value in the plurality of values is represented as a quotient component $e_q$ and a remainder component $e_r$, such that each input value $$v = s2^{\left(e_q + \frac{e_r}{n}\right)},$$

where n is an integer and the sign s is +1 or −1. In an embodiment, the input values are received by the partial sums generation unit 105. In an embodiment, n is a power of two. In an embodiment, the plurality of input values are products computed as part of a convolution operation. In an embodiment, the plurality of input values and the sum are computed as an operation implemented within a neural network model.

At step 160, a set of partial sums is generated by sorting the quotient component for each input value according to the remainder component for the input value. In an embodiment, the partial sums generation unit 105 generates the set of partial sums. To sum a series of p logarithmic format input values $$v, \sum\nolimits_{i=0}^{p-1} v_i, n$$

partial sums $S_i$ are computed, one for each possible remainder component value. Only the quotient component contributions of the exponents are summed initially, and the accumulated quotient component contributions are multiplied by the respective remainder component values, $s2^{i/n}$ after the partial sums are accumulated:

$$S_i = s2^{i/n} \sum\nolimits_{p:e_{rp}=i} 2^{e_{qp}}.$$

The partial sums are then accumulated to produce the sum $$S = \sum\nolimits_{i=0}^{n-1} S_i.$$

In an embodiment, each partial sum is multiplied by a respective remainder component value to produce the set of partial sums.

At step 165, the partial sums in the set of partial sums are summed to produce a sum of the plurality of input values. In an embodiment, the addition unit 125 receives the set of partial sums and produces the sum. Postponing multiplying by the remainder component of the exponents until after the partial sums are accumulated reduces the number of bits toggled. In an embodiment, the sums are converted from integer format to logarithmic format by the conversion unit 130.

In an embodiment, the conversion is performed by finding the leading one within the sum to determine the quotient component of the sum. The sum is shifted left to remove leading zeros and produce a portion of the sum including the leading one and less significant bits of the sum (e.g., an aligned integer). The conversion unit 130 compares the portion with (n−1) midpoints between the different constant (possible remainder component) values, effectively quantizing the portion to produce the sum remainder component. In an embodiment, an array of n−1 comparators within the conversion unit 130 compares the portion with the (n−1) midpoints in parallel. In an embodiment, the conversion unit 130 includes a find-first one circuit to identify the zero-to-one transition in the results of the parallel comparison and output $e_r$.

As the number of bits, n, used to represent the remainder component of the logarithmic format increases, the number of partial sums that are computed increases. Instead of increasing the number of partial sum accumulators 120, a hybrid approximation may be used to apply the approximation technique to the least-significant bits of the remainder component instead of the entire remainder component. The remainder component may be split such that $$e_r = e_{rM} + e_{rL} \text{ and } v = 2^{\left(e_q + \frac{e_{rM}}{n} + \frac{e_{rL}}{k}\right)},$$

where a base factor k is an integer and k>n and when n is a power of 2, k is a higher power of 2. In an embodiment, k is a multiple of n.

For the hybrid approximation, the Mitchell approximation technique may be used to approximate $$2^{\left(\frac{e_{rL}}{k}\right)} = 1 + x, \text{ where } x = \frac{e_{rL}}{k} \text{ and } x < 1.$$

The Mitchell approximation technique is described in J. N. Mitchell, "Computer Multiplication and Division Using Binary Logarithms," in *IRE Transactions on Electronic Computers*, vol. EC-11, no. 4, pp. 512-517, August 1962, the entire contents of which are incorporated herein by reference. The Mitchell approximation always overestimates the remainder component. However, the Mitchell approximation has the lowest error when x is nearest to either zero or one.

Figure 2A:
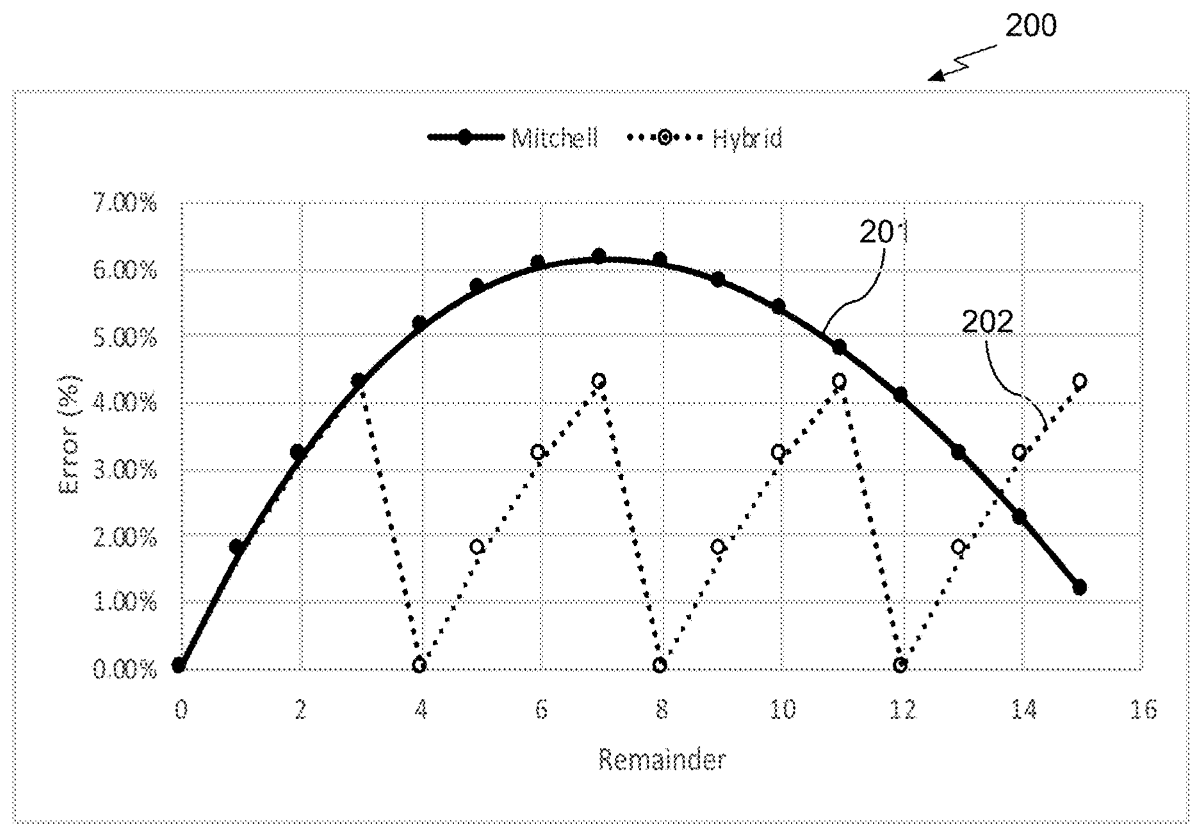
FIG. 2A illustrates a graph of errors for approximated values using a Mitchell approximation and a hybrid approximation technique, in accordance with an embodiment.

FIG. 2A illustrates a graph 200 of errors for approximated values using the Mitchell approximation and a hybrid approximation technique, in accordance with an embodiment. As shown FIG. 2A, when the Mitchell approximation is used to approximate the remainder component, the resulting error is the arc shape 201. Instead of applying the Mitchell approximation technique to the entire remainder component, a hybrid approximation technique may be used that applies the Mitchell approximation technique to only the least-significant portion of the remainder component. The resulting error for the hybrid approximation technique is shown by a sawtooth shape 202. The sawtooth shape 202 results when the partial sums generation unit 105 is modified to implement the approximation $$2^{\left(\frac{e_{rL}}{k}\right)} = 1 + x$$

for the least-significant two bits of a four bit remainder component, using n=4 (0<x<0.25) and a base factor k=16, x={0, 1/16, 2/16, and 3/16}. Overall, the error is less when the hybrid approximation is used to approximate only a portion of the remainder component instead of approximating the entire remainder component. When the hybrid approximation is used for the least-significant two bits of the four bit remainder component, only four partial sum accumulators 120 are needed to produce the set of partial sums instead of 16.

Figure 2B:
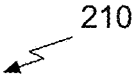
FIG. 2B illustrates another graph of errors for approximated values using the Mitchell approximation and the hybrid approximation technique, in accordance with an embodiment.
Figure 2B:
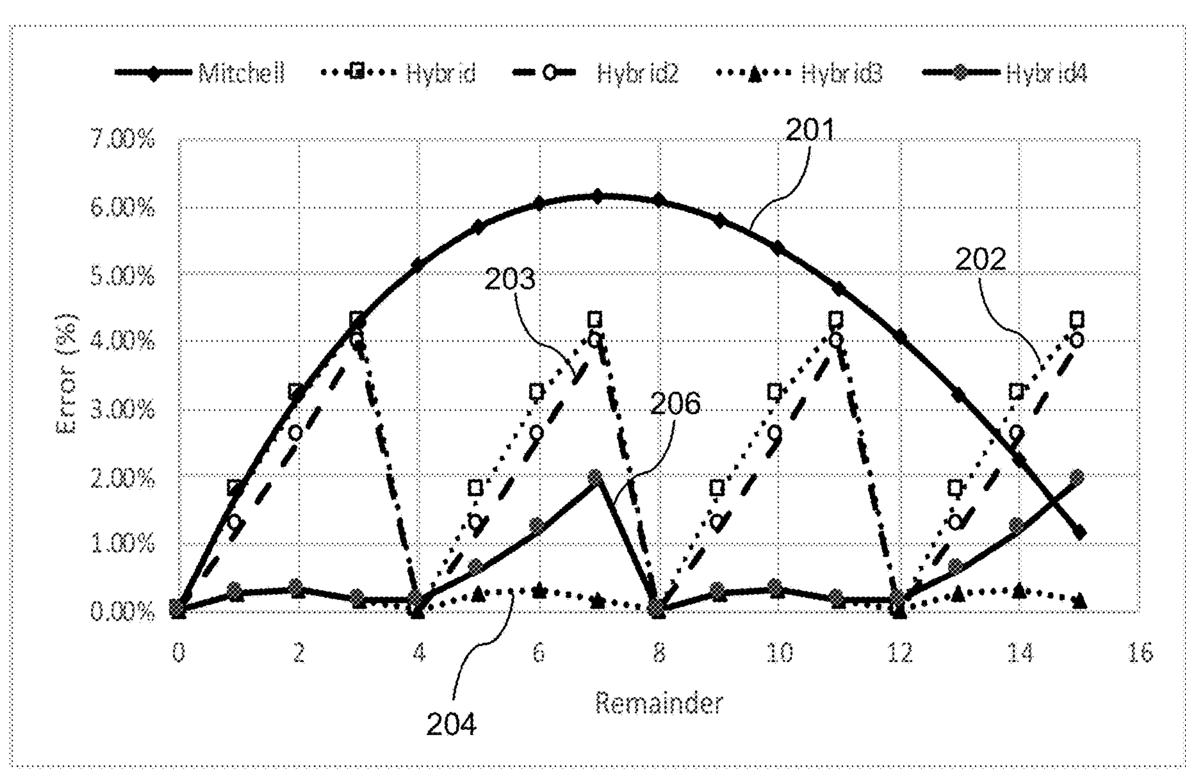

The hybrid approximation may be used to approximate the least-significant bits of the remainder component, $$2^{\left(\frac{e_{rL}}{k}\right)} = 1 + cx,$$

where c=1 to apply the Mitchell approximation and c<1 for the hybrid implementation. FIG. 2B illustrates the resulting error graph 210 for approximated values using a Mitchell approximation and the hybrid approximation technique, in accordance with an embodiment. When c=1, the accumulation operation is $$\left(\sum_{i=0}^{n-1}((16 + e_{rLi}) \ll e_{qi}\right) \gg 4.$$

The sawtooth shape 203 results when the partial sums generation unit 105 is modified to implement the approximation $$2^{\left(\frac{e_{rL}}{k}\right)} = 1 + cx$$

for the least-significant two bits of the remainder component (0<x<0.25) using c=½, n=4, and the base factor k=16.

The nearly flat shape 204 results when the partial sums generation unit 105 is modified to implement the approximation $$2^{\left(\frac{e_{rL}}{k}\right)} = 1 + cx$$

for the least-significant two bits of the remainder component using c=¾, n=4, and the base factor k=16. When c=¾, the accumulation operation is $$\left(\sum_{i=0}^{n-1}((64 + (e_{rLi} \ll 2) - e_{rLi}) \ll e_{qi})\right) \gg 6.$$

The sawtooth shape 206 results when the partial sums generation unit 105 is modified to implement the approximation $$2^{\left(\frac{e_{rL}}{k}\right)} = 1 + cx$$

for the least-significant three bits of the remainder component using c=¾, n=2, and the base factor k=16. When the hybrid approximation is used for the least-significant three bits of the four bit remainder component, only two partial sum accumulators 120 are needed to produce the set of partial sums instead of 16. In each case, the hybrid approximation introduces less error overall compared with using the Mitchell approximation.

Figure 2C:
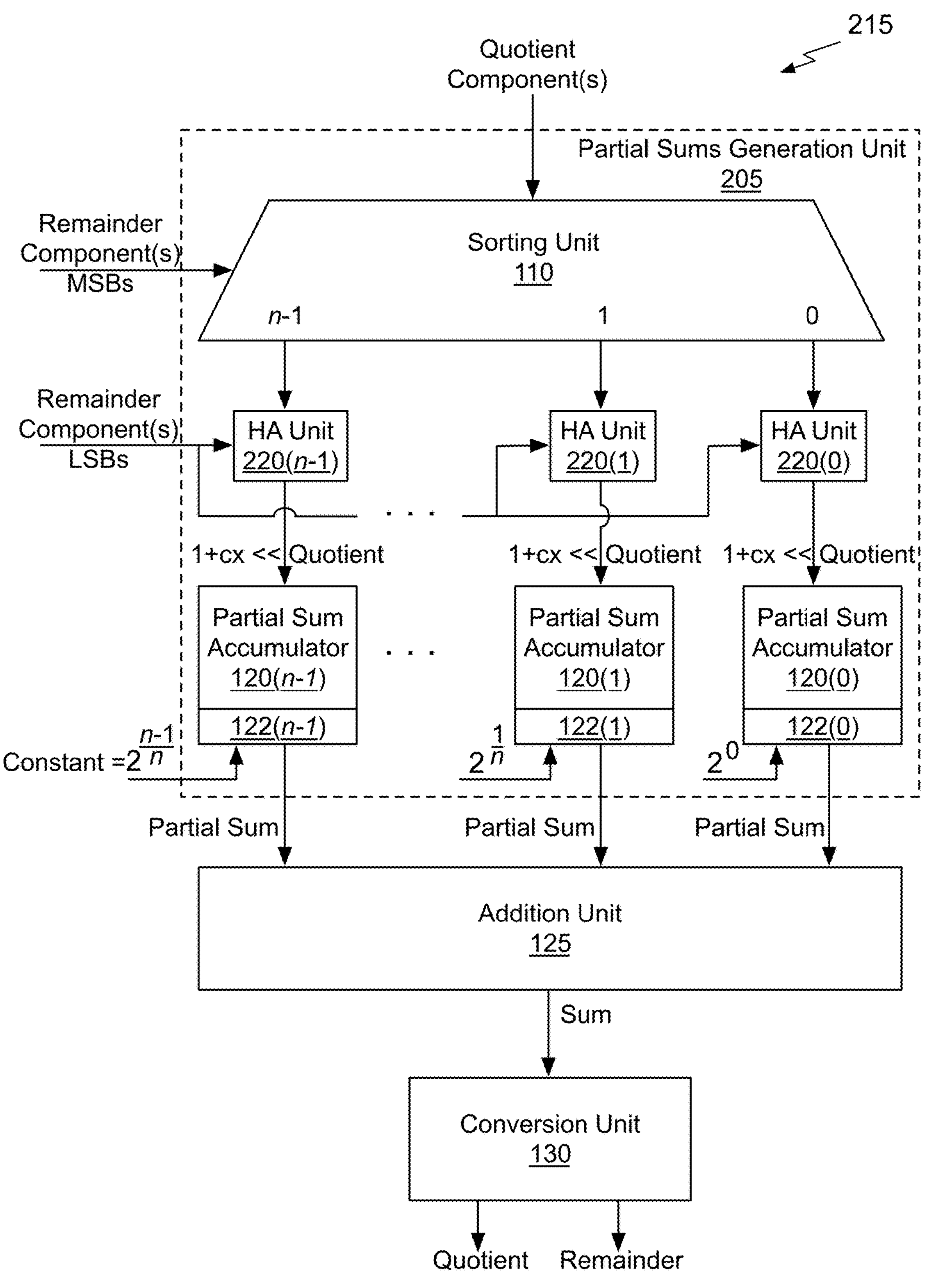
FIG. 2C illustrates a block diagram of another system for accumulating input values represented in a logarithmic format using an approximation technique, in accordance with an embodiment.

FIG. 2C illustrates a block diagram of a system 215 for accumulating values represented in a logarithmic format, in accordance with an embodiment. The system 215 includes a partial sums generation unit 205, the addition unit 125, and the conversion unit 130. As shown in FIG. 2C, the partial sums generation unit 205 includes the sorting unit 110 and the partial sum accumulators 120. However, a hybrid approximation (HA) unit 220 is included between the sorting unit 110 and each partial sum accumulator 120.

The set of partial sums is generated by sorting the quotient component for each input value according to the remainder component for the input value. Each remainder component $e_r$ is separated into a most-significant bit (MSB) portion $e_{rM}$ and a least-significant bit (LSB) portion or subset $e_{rL}$ including at least one or more LSBs. As shown in FIG. 2C, the sorting unit 110 distributes the input quotient components to the HA units 220 according to the MSB portion of the input remainder components. In an embodiment, k is greater than n and the quotient components are routed into n separate HA units 220 and partial sum accumulators 120 to generate the set of partial sums.

The HA units 220 receive the LSB portion of the input remainder components and generate an approximated value, 1+cx. Therefore, the LSB portion of the input remainder component is divided by the base factor k by the HA unit 220 to compute the approximated value. The subset of the remainder component is also multiplied by the scale factor c to produce a product that is summed with one to compute the approximated value. In an embodiment, the HA unit 220 implements a look up table to determine the approximated value. The look up table that contains an entry for each possible value of $e_{rL}$ with as many bits as needed to give a desired level of accuracy. For example, for an $e_{rL}$ of two bits, the look up table includes four entries and may be implemented as a 4-input multiplexer. The inputs to the multiplexer are fixed and gates are omitted for any input bit values of zero.

The approximated value is left-shifted by the quotient component, $(1+cx) \ll e_q$, to produce modified quotient component contributions that are output to the corresponding partial sum accumulator 120. After the modified quotient component contributions are accumulated in each partial sum accumulator 120 for all of the input values to produce partial sums, the partial sum computed by each partial sum accumulator 120 are output to the multipliers 122. Each multiplier 122 scales the output of one of the partial sum accumulators 120 by the corresponding remainder component MSBs (e.g., one of the constants) to produce the set of partial sums for output to the addition unit 125. The set of partial sums are summed by the addition unit 125 to produce the result (sum) in integer format. The sum is converted to logarithmic format by the conversion unit 130.

Figure 2D:
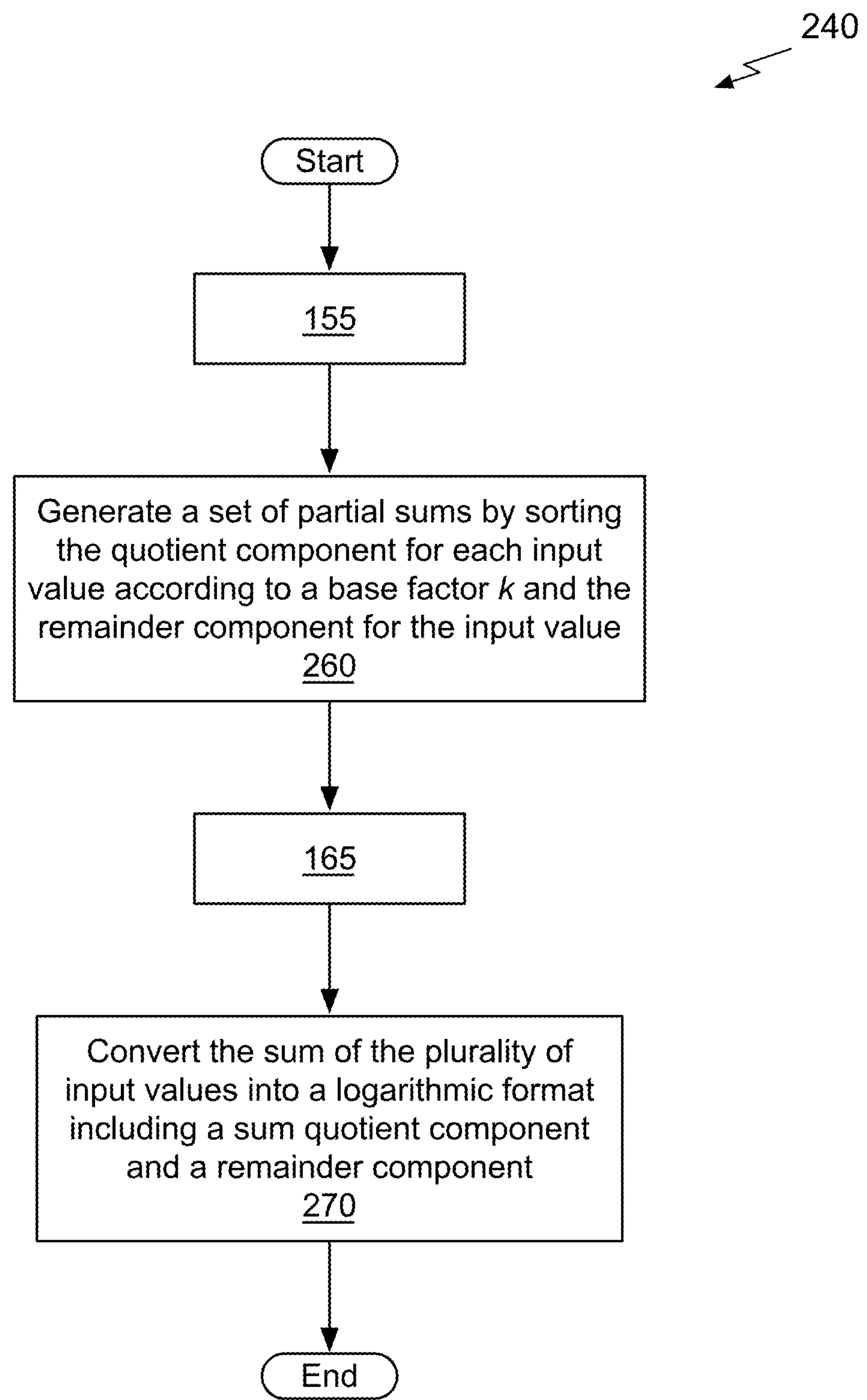
FIG. 2D illustrates a flowchart of a method for accumulating input values represented in a logarithmic format using an approximation technique, in accordance with an embodiment.

FIG. 2D illustrates a flowchart of a method 240 for accumulating values represented in a logarithmic format using the hybrid approximation technique, in accordance with an embodiment. Although method 240 is described in the context of a processing unit, the method 240 may also be performed by a program, custom circuitry, or by a combination of custom circuitry and a program. For example, the method 240 may be executed by a GPU (graphics processing unit), CPU (central processing unit), or any processor capable of computing a sum of input values in logarithmic format. Furthermore, persons of ordinary skill in the art will understand that any system that performs method 240 is within the scope and spirit of embodiments of the present disclosure.

At step 155, a plurality of input values is received for an addition computation. Each input value in the plurality of values is represented as a quotient component $e_q$ and a remainder component $e_r$, such that each input value $$v = s2^{\left(e_q + \frac{e_r}{n}\right)},$$

where n is an integer. In an embodiment, the input values are received by the partial sums generation unit 205. In an embodiment, each remainder component $e_r$ is separated into a most-significant bit (MSB) portion $e_{rM}$ and a least-significant bit (LSB) portion $e_{rL}$, or subset, including at least one or more LSBs. When each remainder component is separated $$\frac{e_r}{n} = \frac{e_{rM}}{n} + \frac{e_{rL}}{k}$$

and each input value $$v = s2^{\left(e_q + \frac{e_{rM}}{n} + \frac{e_{rL}}{k}\right)}.$$

At step 260, a set of partial sums is generated by sorting the quotient component for each input value according to the remainder component for the input value. In an embodiment, the sorting unit 110 distributes the input quotient components according to the MSB portion, $e_{rM}$, of the input remainder components. In an embodiment, the partial sums generation unit 205 generates the set of partial sums. In an embodiment, the LSB portion of the input remainder components, $e_{rL}$, are divided by the base factor k and multiplied by the scale factor c to compute the approximated values. In an embodiment, the approximated values are left-shifted by the quotient component, $(1+cx) \ll e_q$, to produce modified quotient component contributions that are accumulated for all of the input values to produce partial sums. In an embodiment, each partial sum is multiplied by a respective remainder component MSB portion to produce the set of partial sums.

At step 165, the partial sums in the set of partial sums are summed to produce a sum of the plurality of input values. In an embodiment, the addition unit 125 receives the set of partial sums and produces the sum. Postponing multiplying by the remainder MSB portion until after the partial sums are accumulated reduces the number of bits toggled. At step 270, the sum of the plurality of input values is converted into logarithmic format including a sum quotient component and remainder component by the conversion unit 130.

Logarithmic-based arithmetic may be used to reduce area and energy consumption, particularly for neural network computations requiring many multiplications and summing of products. Multiplication of logarithmic format values is straightforward and energy efficient as the exponents are simply added. In contrast, performing addition on logarithmic format values is more complex. For addition operations, the exponents of logarithmic format values may be decomposed into separate quotient and remainder components for processing by the system 100, 155, and/or 215 to produce a sum in integer or logarithmic format.

Summing the contribution of quotient component values sorted according to common exponent remainder components greatly simplifies the addition process. For example, only a single lookup and multiply by constant is needed per partial sum to compute the set of partial sums, rather than multiplying each quotient component contribution by the remainder for each input value. The summation algorithm implemented by the system 100, 155, and/or 215 reduces bit toggling compared with conventional techniques. Furthermore, the hybrid approximation technique implemented by the system 215 may be used to improve energy efficiency by limiting the number of partial sum accumulators 120 even when the number of bits used to represent the remainder is increased to improve accuracy.

The system 100, 155, and/or 215 may be used to perform dot product and multiply accumulate functions that are core math functions for linear algebra involved in deep learning inference or training systems. The logarithmic-based arithmetic implemented by the system 100, 155, and/or 215 is particularly well-suited for deep learning inference tasks, such as image classification, object detection, segmentation, and the like, because low-precision number representations can be used while also maintaining computational accuracy.

Parallel Processing Architecture

Figure 3:
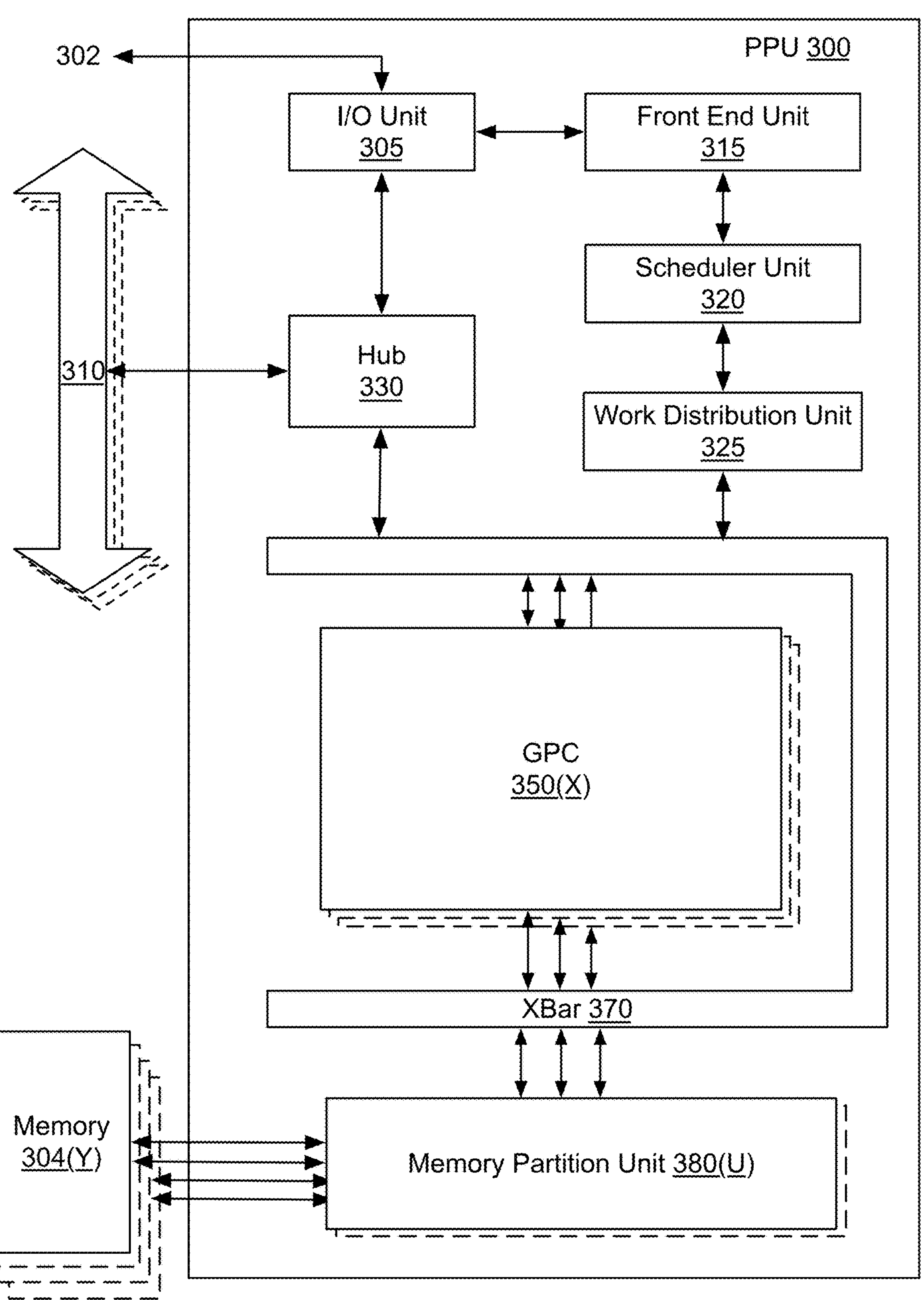
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5C.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QOS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
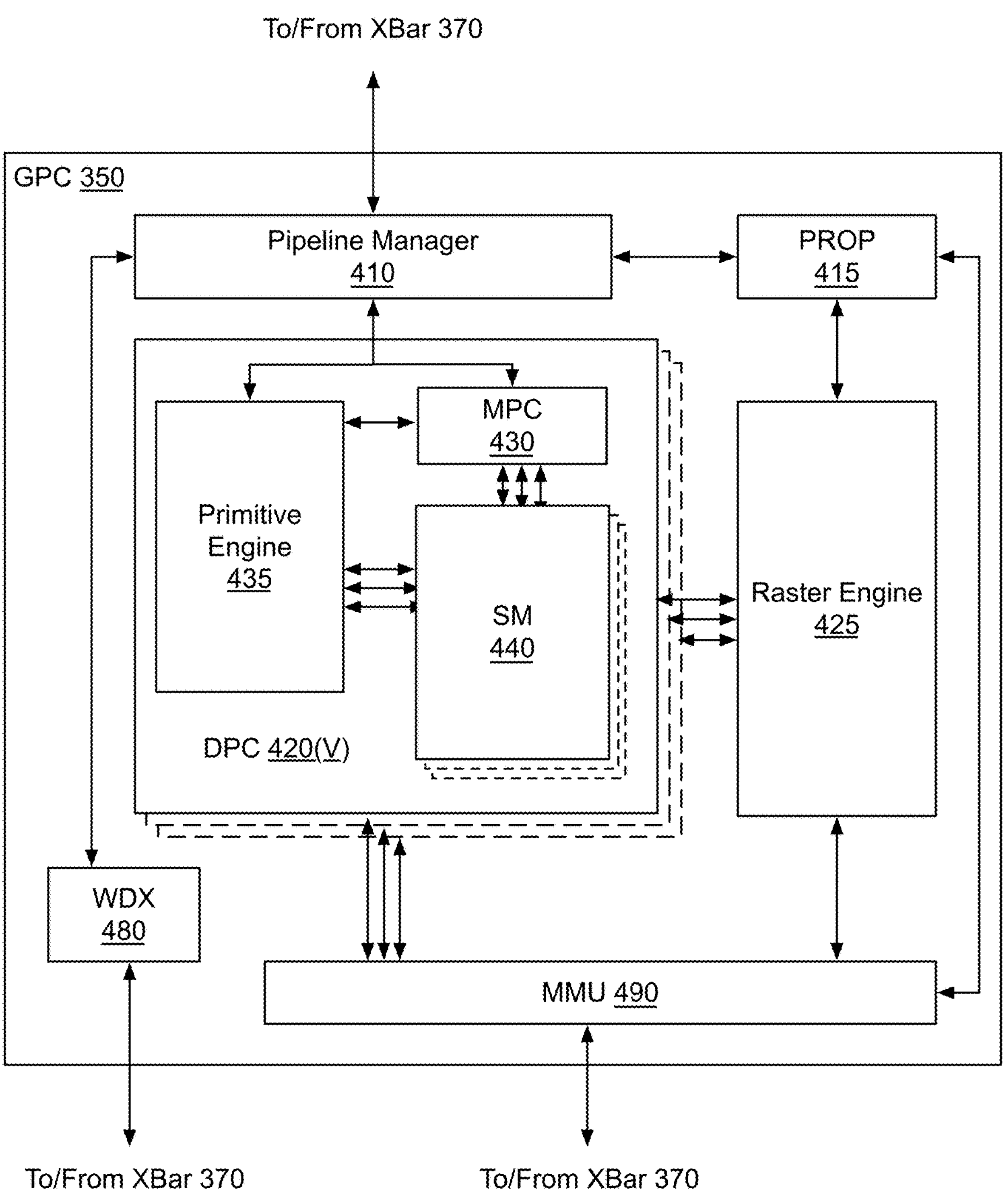
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
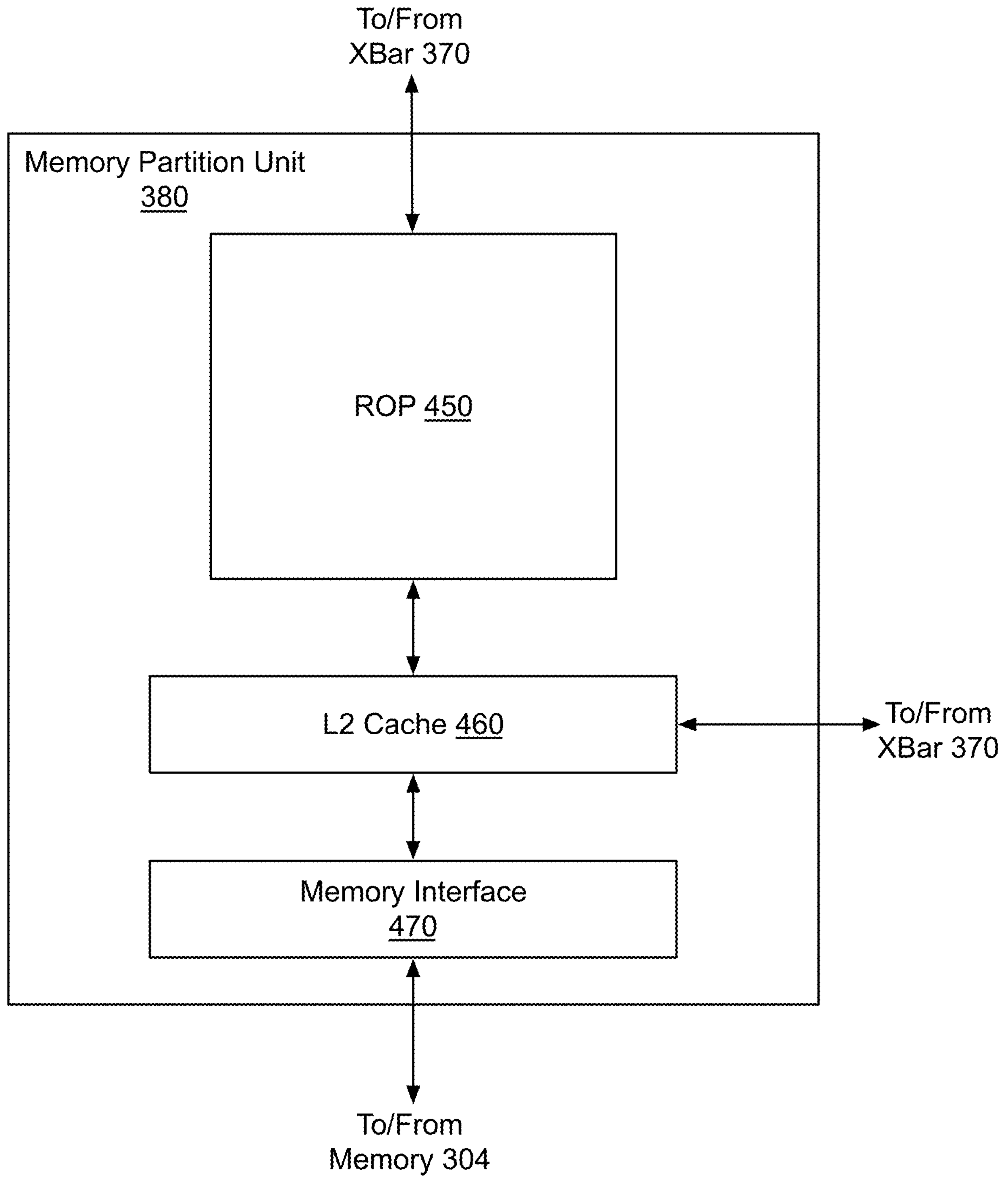
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
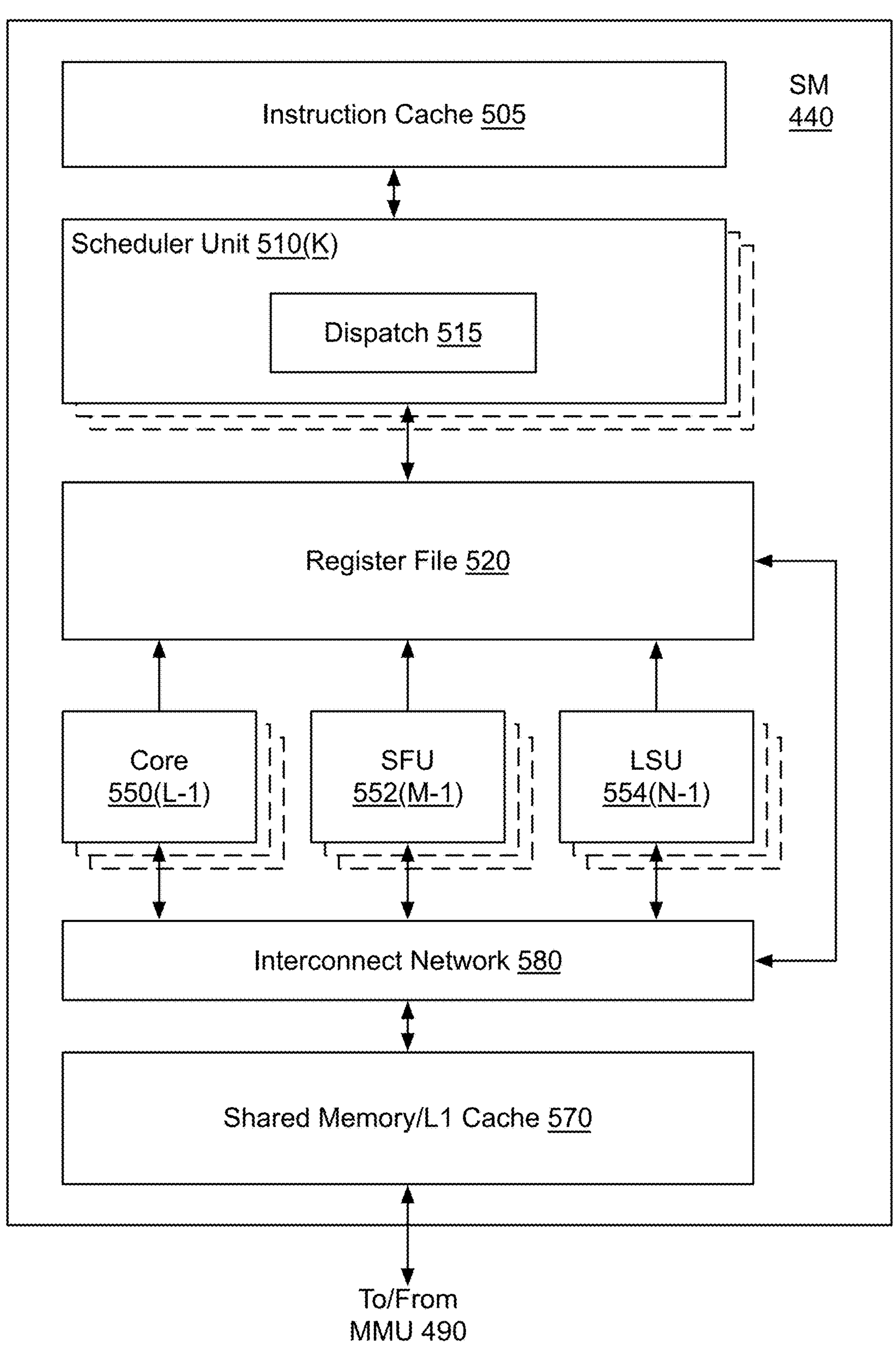
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In an embodiment, the Tensor cores are configured to perform matrix multiply operations on values represented in a logarithmic format. In an embodiment, one or more of the cores 550 is implemented using at least a portion of the system 100, 115, or 215, such as the partial sums generation 105 or 205, addition unit 125, and conversion unit 130. Partial sums and sums may be computed for values represented in a logarithmic format to efficiently perform dot product operations, multiply accumulate operations, sum of product operations, and convolution operations for neural network training and inferencing. More specifically, the partial sums generation 105 or 205, addition unit 125, and conversion unit 130 may be used to reduce energy consumption and satisfy accuracy requirements compared with using conventional techniques. The logarithmic format is particularly suitable for deep learning inferencing because low-precision number representations can be used with minimal or no loss of accuracy. For example, the system 100, 115, or 215 using the logarithmic format may be used to compute energy-efficient dot products with low-precision numbers for voice, language, image, video processing, and the like. Dot products are the core math computation needed for linear algebra involved in deep learning inference or training workloads. Therefore, the system 100, 115, or 215 may be used to perform dot product computations for deep learning systems.

In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

Figure 5B:
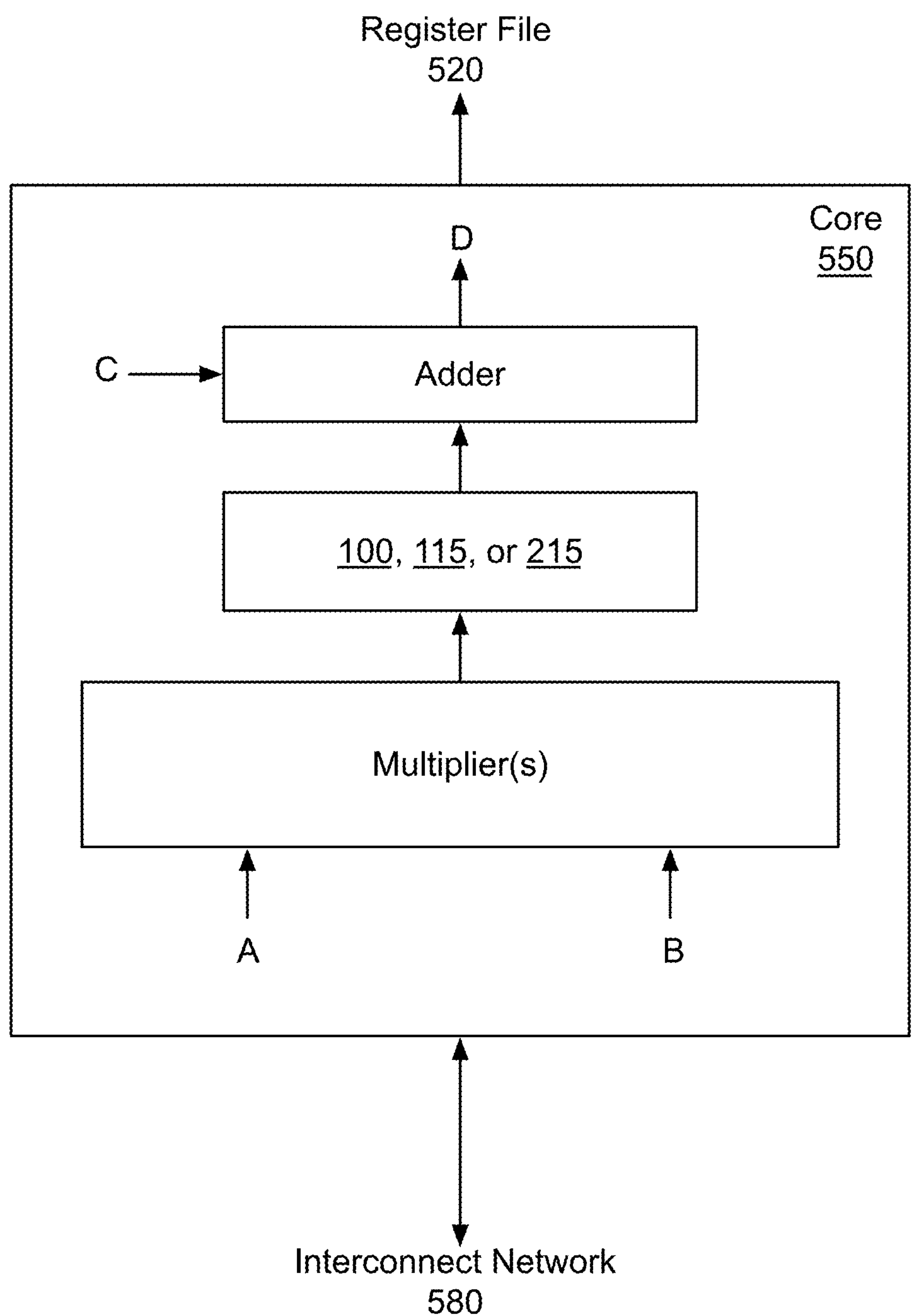
FIG. 5B illustrates the processing core, of FIG. 5A, in accordance with an embodiment.

FIG. 5B illustrates the processing core 550, of FIG. 5A, in accordance with an embodiment. The core 550 includes multiplier(s), the system 100, 115, or 215, and an adder. In an embodiment, the multiplier(s) receive input matrices A and B represented in logarithmic format and output products to the system 100, 115, or 215 to accumulate the products for a multiply-accumulate operation, generating a result matrix. In an embodiment, elements of the result matrix are added with elements of the matrix C by the adder. In an embodiment, the adder is implemented as a system 100, 115, or 215. In an embodiment, the core 550 is configured to perform a 4×4×4 matrix multiply and much larger two-dimensional or higher dimensional matrix operations are performed by decomposing the larger matrices. Results of the matrix operations may be used to perform one or more functions for HPC, data center, and machine learning applications. In particular, the system 100, 115, or 215 may be configured to accelerate matrix and vector arithmetic for deep learning systems and applications. For example, the system 100, 115, or 215 may be configured to perform convolution operations for one or more layers of a neural network during training or inferencing for tasks including, but not limited to, classification, object detection, segmentation, clustering, and regression.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5C:
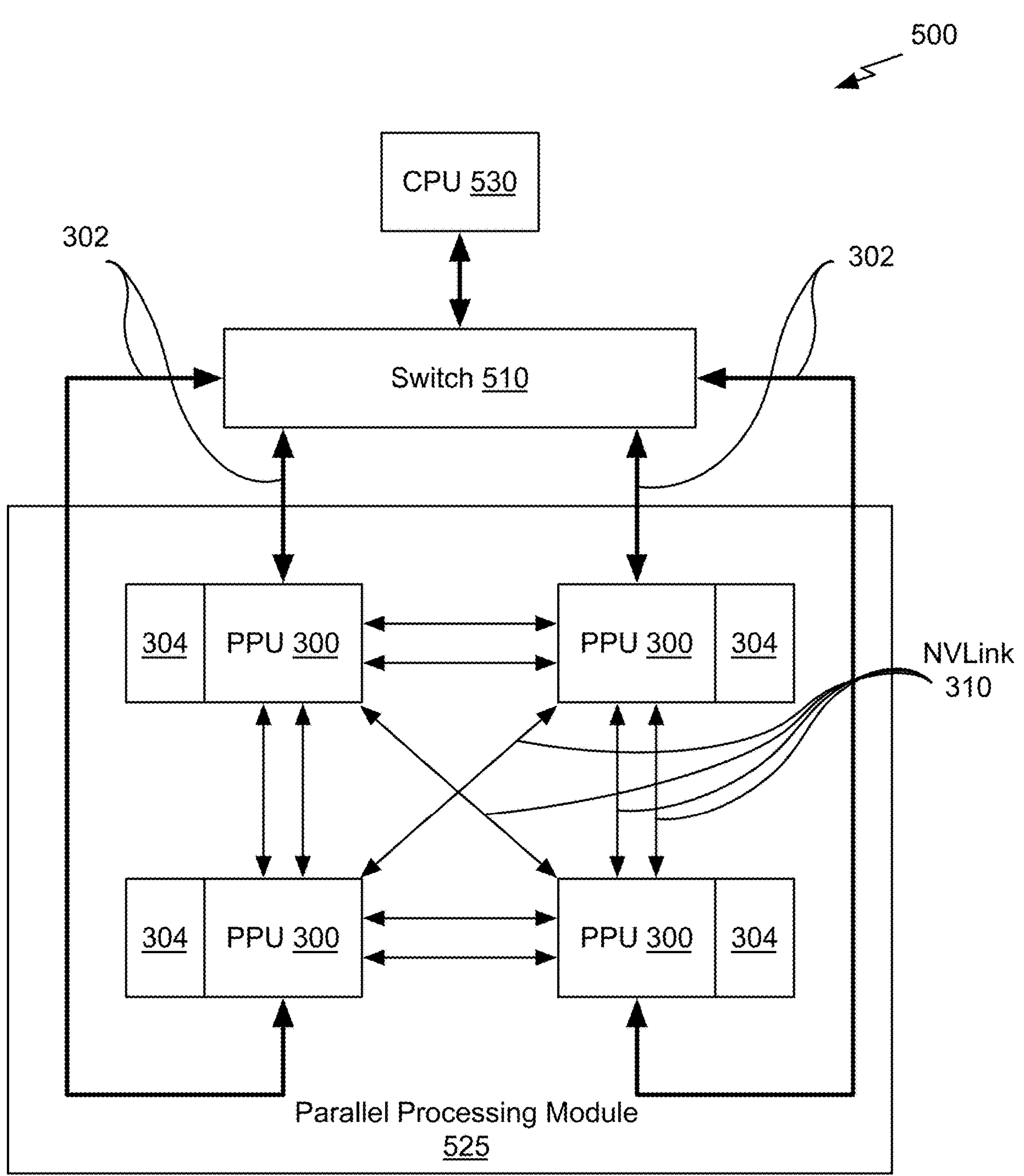
FIG. 5C is a conceptual diagram of a processing system implemented using the PPU of FIG. 3, in accordance with an embodiment.

FIG. 5C is a conceptual diagram of a processing system 500 implemented using the PPU 300 of FIG. 3, in accordance with an embodiment. The exemplary system 565 may be configured to implement the method 150 shown in FIG. 1C or the method 240 shown in FIG. 2D. The processing system 500 includes a CPU 530, switch 510, and multiple PPUs 300, and respective memories 304. The NVLink 310 provides high-speed communication links between each of the PPUs 300. Although a particular number of NVLink 310 and interconnect 302 connections are illustrated in FIG. 5C, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules (MCMs) with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5C, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5C, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5D:
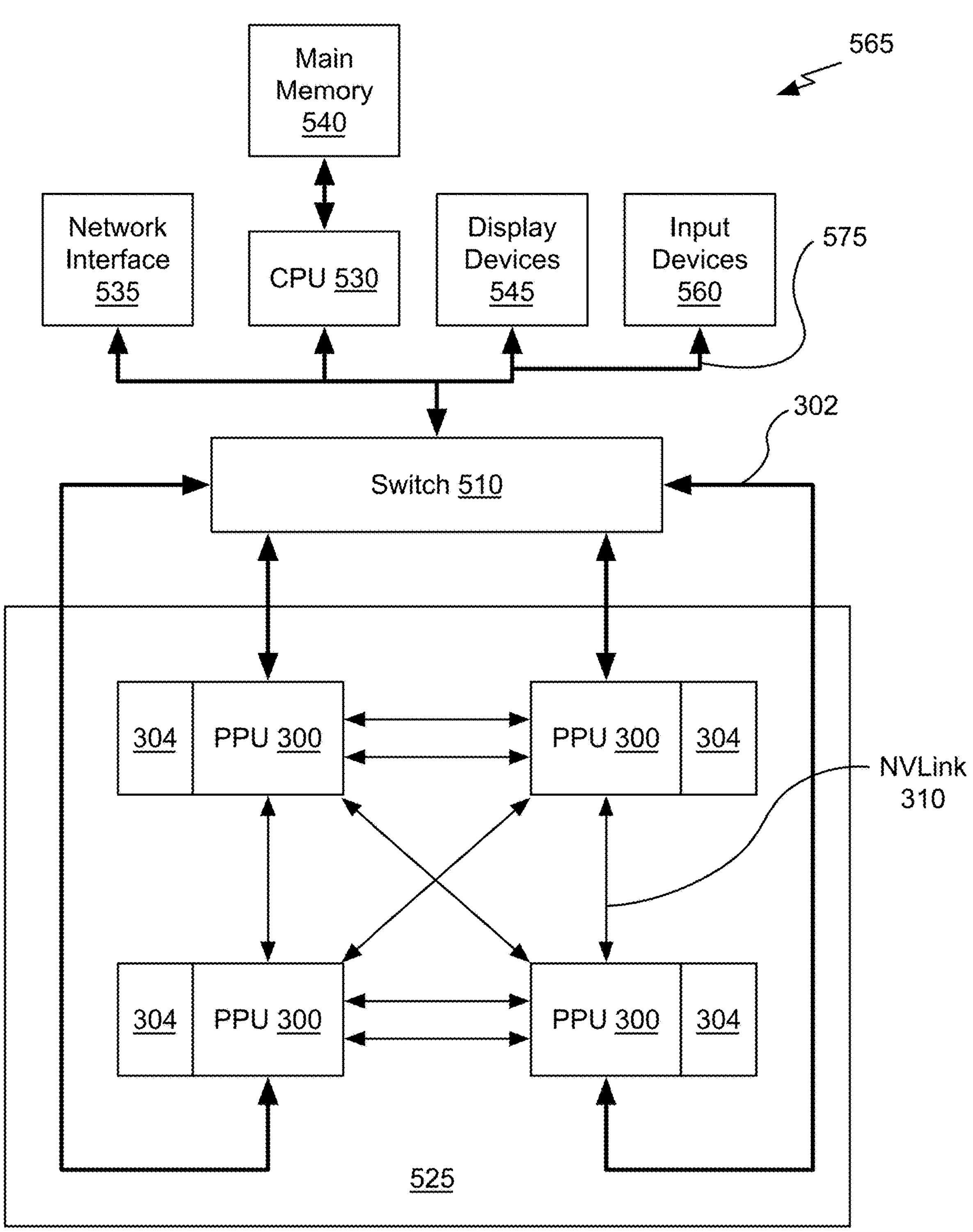
FIG. 5D illustrates an exemplary system in which the various architecture and/or functionality of the various previous embodiments may be implemented.

FIG. 5D illustrates an exemplary system 565 in which the various architecture and/or functionality of the various previous embodiments may be implemented. The exemplary system 565 may be configured to implement the method 150 shown in FIG. 1C or the method 240 shown in FIG. 2D.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron is the most basic model of a neural network. In one example, a neuron may receive one or more inputs that represent various features of an object that the neuron is being trained to recognize and classify, and each of these features is assigned a certain weight based on the importance of that feature in defining the shape of an object.

A deep neural network (DNN) model includes multiple layers of many connected nodes that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. A loss function is computed based on differences between the correct label and the predicted label. During a backward propagation phase, partial derivatives of the loss function are propagated back through the DNN and the weights are adjusted for each feature to improve the accuracy of the DNN. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on tensor math operations, and complex multi-layered networks require tremendous amounts of floating-point performance and bandwidth for both efficiency and speed. With thousands of processing cores, optimized for tensor math operations, and delivering tens to hundreds of TFLOPS of performance, the PPU 300 is a computing platform capable of delivering performance required for deep neural network-based artificial intelligence and machine learning applications. The system 100, 115, or 215 may be configured to perform the tensor math operations.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

Asynchronous Accumulator Using Logarithmic-Based Arithmetic

When weights and activations are represented with a logarithmic number system and multiplication by a constant is deferred, as described in conjunction with the partial sum accumulators 120 and the multipliers 122 in FIGS. 1B and 2C, the energy consumed by the partial sums generation unit 105 may be further reduced by using asynchronous accumulators. As shown in FIGS. 1B and 1C, a partial sum accumulator 120 is included for each constant. However, the amount added to each partial sum accumulator 120 as a result of a multiplication operation (e.g., 1<<Quotient) has only a single bit set. For each quotient, only one of the n partial sum accumulators 120 is selected by the remainder component and only one of bit of the selected partial sum accumulator 120 is incremented.

If a conventional synchronous accumulator is used to implement the partial sums generation unit 105 or 205, considerable energy may be consumed clocking the entire accumulator (typically 8-24 bits in length) even though on average fewer than two bits of the output toggle. To reduce the energy consumed, the synchronous partial sum accumulators 120 may each be replaced with an asynchronous accumulator. The number of asynchronous accumulators may equal the number of possible remainder component values. The sorting unit 110 is modified to output an identifier for the asynchronous accumulator i of the n asynchronous accumulators to be incremented (or decremented). In an embodiment, the identifier is a one-hot encoding of the remainder component. The sorting unit 110 is modified to output a bit indicator that selects the bit of the identified asynchronous accumulator where the increment/decrement is inserted. A single shifter (1<<Quotient) may be used to generate a one-hot encoded bit selection from the quotient component and a sign bit controls whether the bit identified by the bit selection is incremented or decremented. In an embodiment, a positive sign bit (e.g., +1 or logic low) corresponds to an increment input and a negative sign bit corresponds to a decrement input (e.g., −1 or logic high).

Figure 6A:
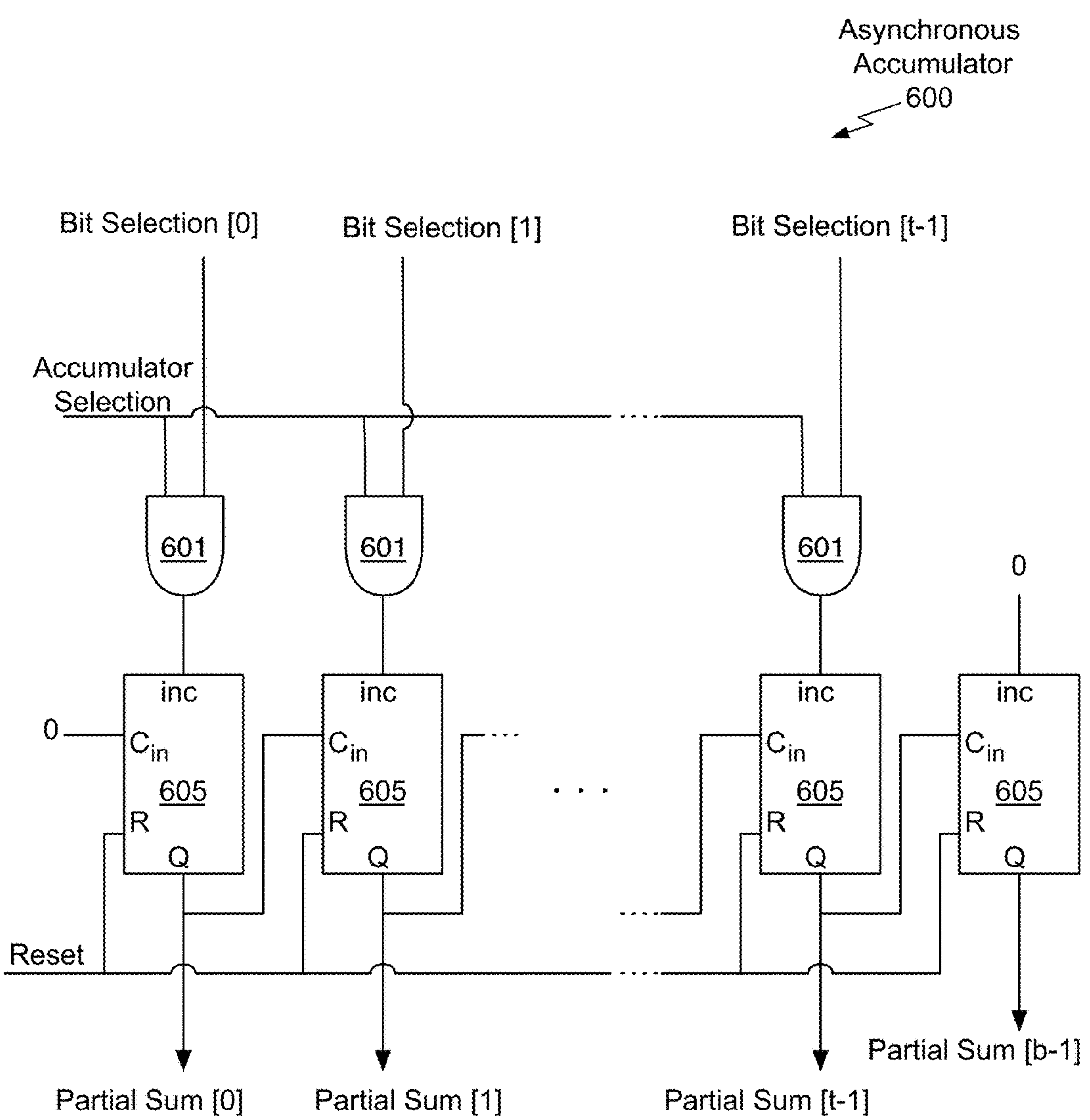
FIG. 6A illustrates a block diagram of an asynchronous accumulator, in accordance with an embodiment.

FIG. 6A illustrates a block diagram of an asynchronous accumulator 600, in accordance with an embodiment. In an embodiment, multiple asynchronous accumulators 600 are used to generate partial sums, where each asynchronous accumulator 600 corresponds with a different possible value of the remainder component. In an embodiment, the number of asynchronous accumulators 600 is the number of possible remainder component values n. An accumulator selection signal is a one-hot encoding of the remainder component and the accumulator selection input is the single bit of the accumulator selection signal corresponding to the particular asynchronous accumulator 600. Each one of the n asynchronous accumulators 600 receives a different bit of the accumulator selection signal.

The bit selection signal is the one-hot encoded bit selection from the quotient component. The number of bits in the bit selection signal, t is limited by the largest possible quotient value and equals one more than the largest possible quotient value. Each one of the n asynchronous accumulators 600 receives the entire bit selection signal (e.g., t bits). An asynchronous reset signal is used to initialize the asynchronous accumulator 600 for each new computation.

An array of AND gates 601 combines the bit selection signal with each bit of the accumulator selection signal, with each row of AND gates 601 corresponding to one bit of the accumulator selection signal. In an embodiment, the AND gates 601 are located near the corresponding flip-flops 605 when fabricated in silicon. Each partial sum for a bit j of the partial sum output is used as a carry-in ($C_{in}$) to the next flip-flop 605 that generates the partial sum for bit j+1. The flip-flop 605 toggles an output Q whenever $C_{in}$ falls from a logic one (high) to a logic zero (low) or whenever the inc (increment) input toggles. Note that because only a single bit of the bit selection signal is asserted at a time, both the $C_{in}$ and inc inputs should not toggle at the same time for any of the flip flips 605.

The asynchronous accumulator 600 may generate b bits of partial sum. While the number of bits t in the bit selection signal is limited by the largest possible quotient value, (b−t) additional MSB flip-flops 605 may be included in the asynchronous accumulator 600, each with the inc input set to a logic zero. As shown in FIG. 6A, a single additional MSB flip-flop 605 is included in the asynchronous accumulator 600. In other embodiments, more additional MSB flip-flops 605 may be included or, when b=t, no additional MSB flip-flops are included. Compared with a conventional synchronous accumulator, the clock signal is not provided as an input to each flip-flop 605 and for each value to be summed and only one of the inc inputs to the flip-flops 605 toggles. The inc input may propagate from the Q output to the $C_{in}$ input through one or more of the flip-flops 605.

In an embodiment, signed asynchronous accumulation is performed by including a pair of asynchronous accumulators 600 for each possible remainder component value, where a first asynchronous accumulator 600 in the pair is incremented for positive sign s (+1) and a second asynchronous accumulator 600 in the pair is decremented for negative sign s (−1). The partial sums for the pair are combined before the partial sum is scaled by the remainder component using the multipliers 122.

Figure 6B:
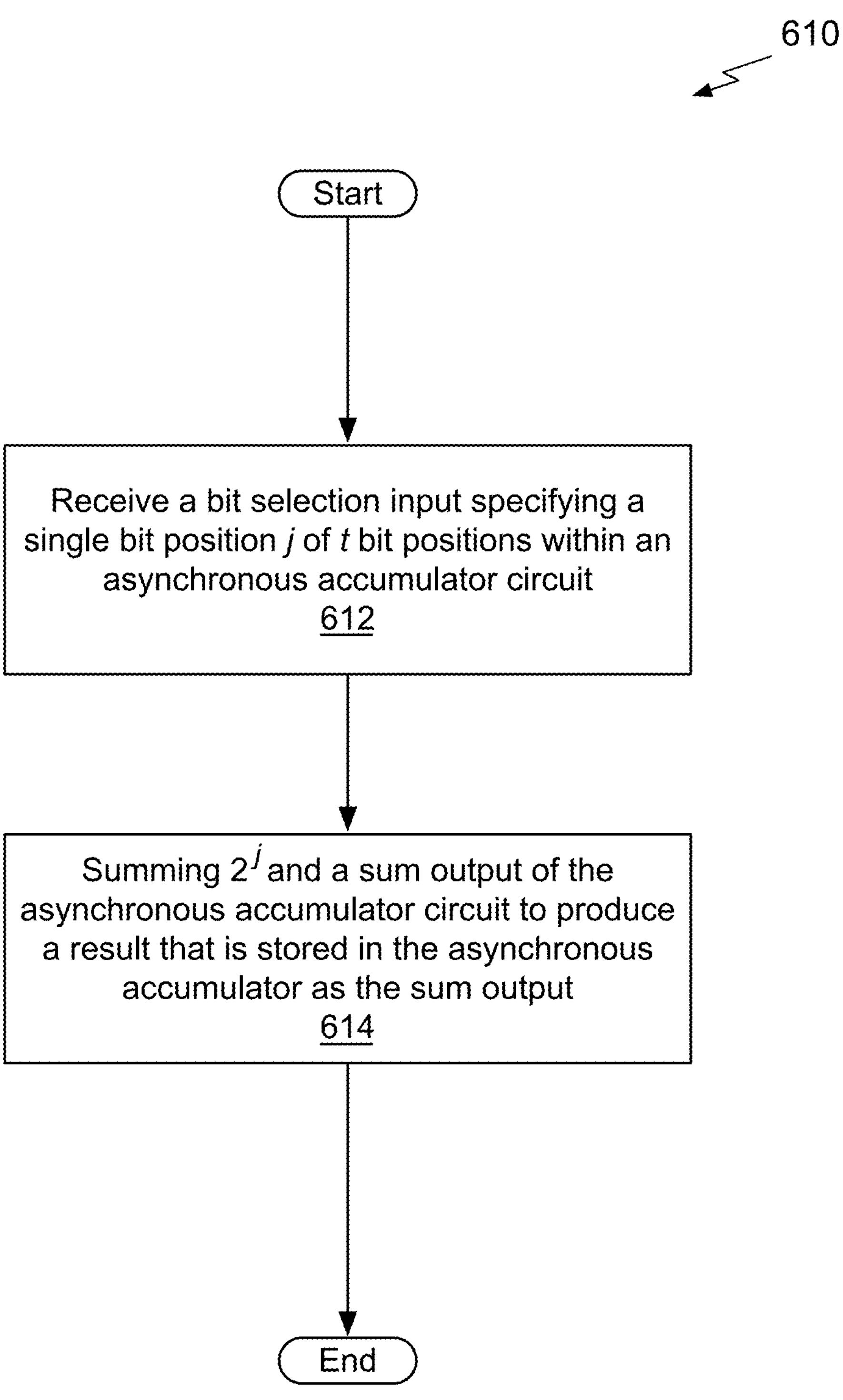
FIG. 6B illustrates a flowchart of a method for accumulating input values represented in a logarithmic format using an asynchronous accumulator, in accordance with an embodiment.

FIG. 6B illustrates a flowchart of a method 610 for accumulating input values represented in a logarithmic format using an asynchronous accumulator, in accordance with an embodiment. Although method 610 is described in the context of a processing unit, the method 610 may also be performed by a program, custom circuitry, or by a combination of custom circuitry and a program. For example, the method 610 may be executed by a GPU, CPU, or any processor capable of computing a sum of input values in logarithmic format using an asynchronous accumulator. Furthermore, persons of ordinary skill in the art will understand that any system that performs the method 610 is within the scope and spirit of embodiments of the present disclosure.

At step 612, a bit selection input is received, where the bit selection input specifies a single bit position j of t bit positions within an asynchronous accumulator circuit, such as the asynchronous accumulator 600. At step 614, a value of $2^j$ is summed with an output of the asynchronous accumulator circuit to produce a result that is stored in the asynchronous accumulator 600 as the output. In an embodiment, the output is the partial sum output by the asynchronous accumulator 600. It will be appreciated that the results stored as the output of the asynchronous accumulator 600 at any given point in time is the partial sum for all values accumulated following a reset of the asynchronous accumulator 600 and will be incremented or decremented as new values are received.

Figure 6C:
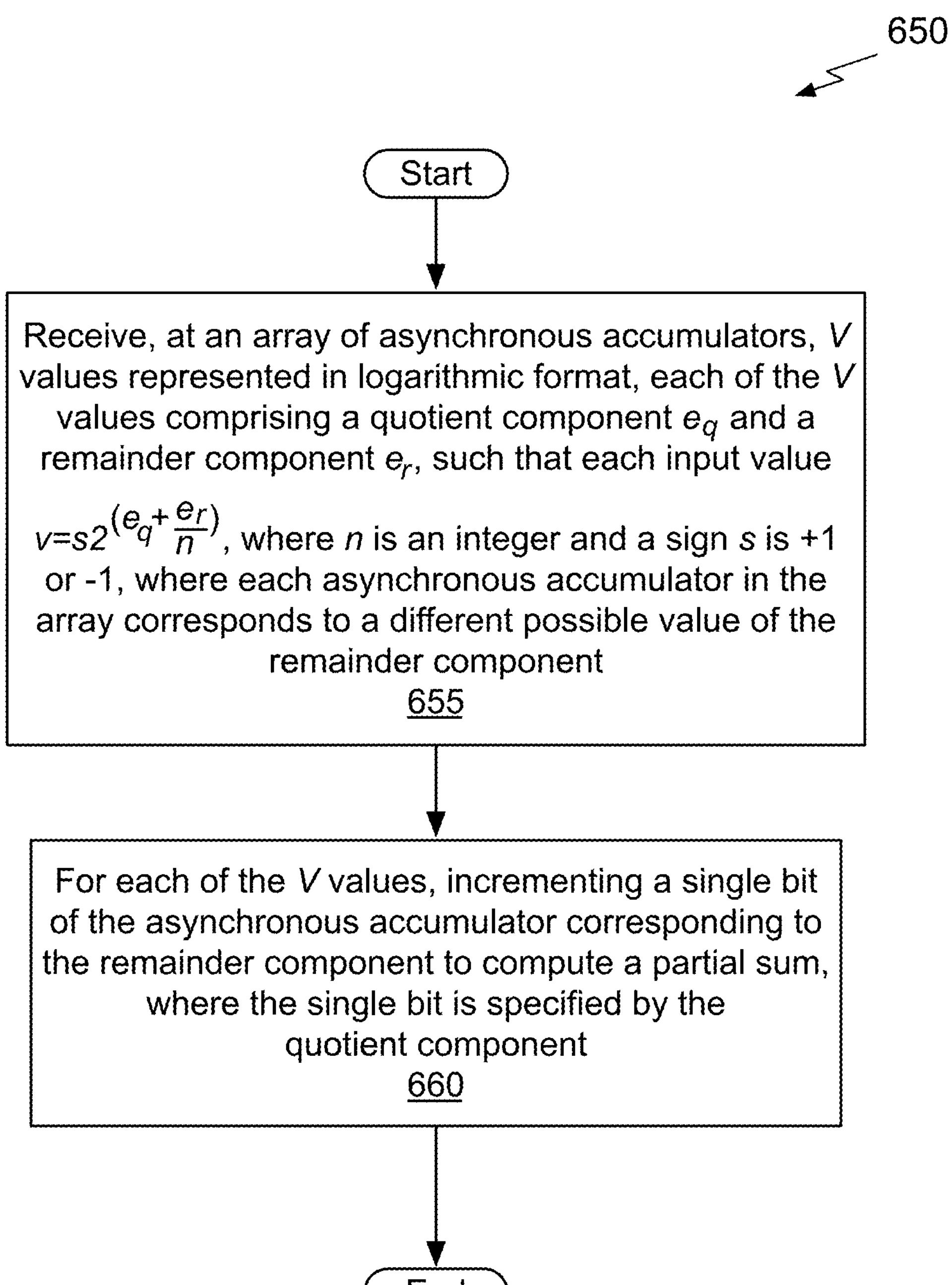
FIG. 6C illustrates a flowchart of a method for computing a partial sum using an array of asynchronous accumulators, in accordance with an embodiment.

FIG. 6C illustrates a flowchart of a method 650 for computing a partial sum using an array of asynchronous accumulators, in accordance with an embodiment. Although method 650 is described in the context of a processing unit, the method 650 may also be performed by a program, custom circuitry, or by a combination of custom circuitry and a program. For example, the method 650 may be executed by a GPU, CPU, or any processor capable of computing a sum of input values in logarithmic format using an array of asynchronous accumulators. Furthermore, persons of ordinary skill in the art will understand that any system that performs the method 650 is within the scope and spirit of embodiments of the present disclosure.

At step 655, V values represented in logarithmic format are received at an array of asynchronous accumulators, each of the V values comprising a quotient component $e_q$ and a remainder component $e_r$, such that each input value equals two to a power of a sum of the remainder component and the quotient component. Specifically, in an embodiment, each input value $$v = s2^{\left(e_q + \frac{e_r}{n}\right)},$$

where n is an integer and the sign s is +1 or −1. Each asynchronous accumulator in the array corresponds to a different possible value of the remainder component. In an embodiment, the V values are received by an array of asynchronous accumulators 600. In an embodiment, n is a power of two. In an embodiment, the V values are products computed as part of a convolution operation. In an embodiment, the V values are accumulated as an operation implemented within a neural network model.

At step 660, for each of the V values, a single bit of the asynchronous accumulator corresponding to the remainder component is incremented to compute a partial sum, where the single bit is specified by the quotient component. To sum a series of V logarithmic format input values $$v, \sum_{i=0}^{N-1} v_i, n$$

partial sums $S_i$ are computed, one for each possible remainder component value. In an embodiment, the partial sums are computed by an array of the asynchronous accumulators 600.

Only the quotient component contributions of the exponents are summed initially, and the accumulated quotient component contributions are multiplied by the respective remainder component values, $s2^{i/n}$ after the partial sums are accumulated:

$$S_i = s2^{i/n} \sum_{p:e_{rp}=i} 2^{e_{qp}}.$$

The partial sums are then accumulated to produce the sum $$S = \sum_{i=0}^{n-1} S_i.$$

In an embodiment, each partial sum is multiplied by a respective remainder component value to produce the set of partial sums.

The partial sums in the set of partial sums are then summed to produce a sum of the V values. In an embodiment, the addition unit 125 receives the set of partial sums and produces the sum. Postponing multiplying by the remainder component of the exponents until after the partial sums are accumulated reduces the number of bits toggled. Replacing synchronous accumulators with the asynchronous accumulators 600 reduces the energy consumed to compute the partial sums.

Figure 6D:
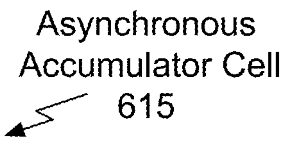
FIG. 6D illustrates a diagram of an asynchronous accumulator cell, in accordance with an embodiment.
Figure 6D:
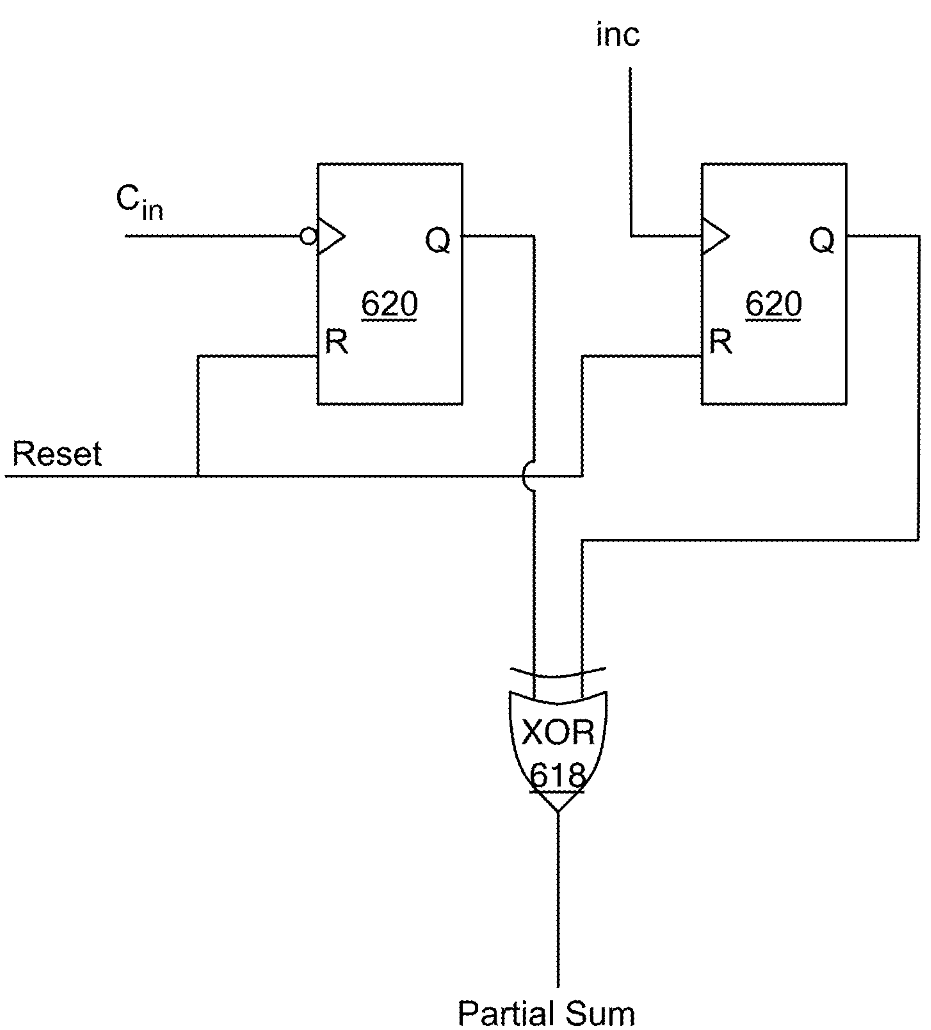

FIG. 6D illustrates a diagram of an asynchronous accumulator cell 615, in accordance with an embodiment. The asynchronous accumulator cell 615 may be used to implement the flip-flop 605 to produce each bit of the asynchronous accumulator 600. The asynchronous accumulator cell 615 comprises a pair of toggle flip-flops 620 and an exclusive-or (XOR) gate 618. A first toggle flip-flop 620 receives the inc input and toggles a first signal Q in response to each low-to-high (rising) transition of the inc input. In other words, the first signal Q transitions once (either rising or falling) for each rising transition of the inc input. A second toggle flip-flop 620 toggles a second signal Q in response to each high-to-low (falling) transition of the $C_{in}$ input ($C_{in}$ is inverted for input to the second toggle flip-flop 620). The $C_{in}$ input to the second toggle flip-flop 620 receives the partial sum output from the least significant bit asynchronous accumulator cell 615 within the asynchronous accumulator 600. When the reset signal is asserted (logic high), the Q signals are negated (logic low) and the partial sum is negated by the XOR gate. When b>t, the inc input is set to a logic zero and the b−t additional asynchronous accumulator cells 615 may be implemented using only the second toggle flip-flop 620 to generate additional MSBs of the partial sum.

Figure 6E:
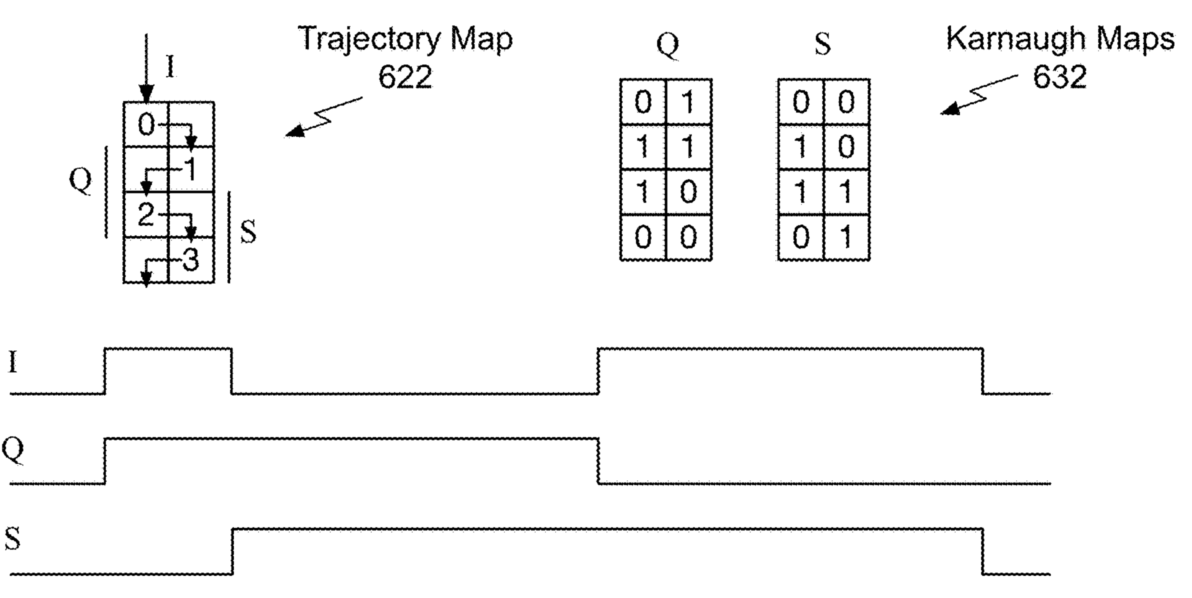
FIG. 6E illustrates a trajectory map, Karnaugh maps, and a diagram of an asynchronous toggle flip-flop, in accordance with an embodiment.
Figure 6E:
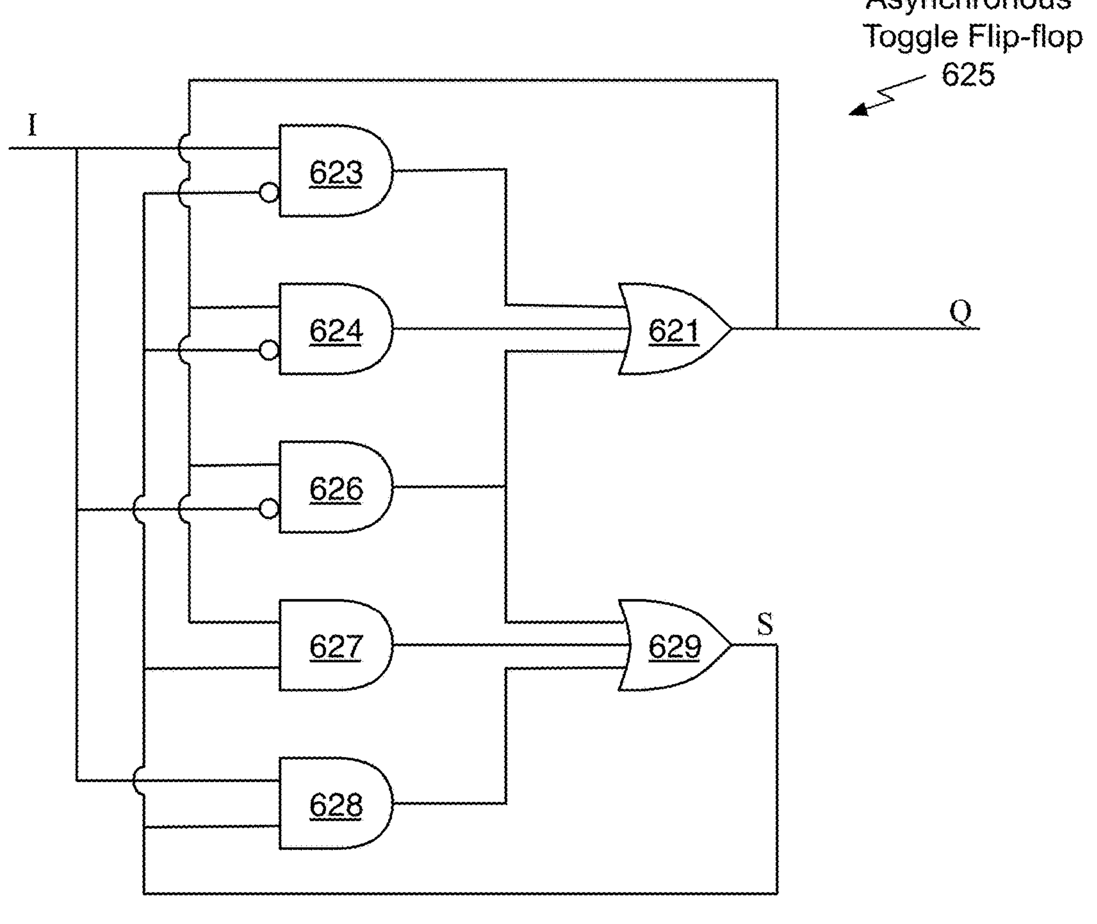

FIG. 6E illustrates a trajectory map 622, Karnaugh maps 632, and a diagram of an asynchronous toggle flip-flop 625, in accordance with an embodiment. Dally et al. describes the trajectory map for a toggle flip-flop in *Digital Systems Engineering*, Cambridge University Press, Section 10.4.3.3, pp. 495-6 (1998), which is incorporated herein its entirety. As shown by the trajectory map 622, in a stable state 0 (first row left square "0"), the input I (inc) and both state variables (Q and S) are low (I,Q,S)=000. When the input I rises (arrow to the right), the circuit moves to first transient state (I,Q, S)=100 (first row right square). From the first transient state, the output Q rises as the circuit moves to a stable state 1 (second row right square "1") where (I,Q,S)=110.

The input I falling causes a transition from the stable state 1 through a second transient state (I,Q,S)=010 (second row left square) to a stable state 2 (third row left square "2") where (I,Q,S)=011 with state variable S high. The next rising edge of I moves the circuit through a third transient state (I,Q,S)=111 (third row right square) to a stable state 3 (bottom row right square "3") where (I,Q,S)=101 causing the output Q to fall. When I falls for the second time, the circuit moves through a fourth transient state (I,Q,S)=001 returning to the stable state 0.

The Karnaugh maps 632 for Q and S are derived from the trajectory map 622. For each stable state in the trajectory map 622, the Karnaugh maps 632 for the state variables are set to the current state. For example, in the stable state 0 both Q and S are 0 and in the stable state 2 both Q and S are 1. For each transient state, the Karnaugh maps 632 are set to the next state. For example, in the first transient state 100, Q is set to 1 and S is set to 0—reflecting the next stable state 1 (110). The waveform diagram illustrates an example of the transitions shown in the trajectory map 622 and the Karnaugh maps 632.

A logic diagram for the asynchronous toggle flip-flop 625 without the reset function includes AND gates 623, 624, 626, 627, and 628 and OR gates 621 and 629. The two OR gates share the $I' \wedge Q$ term output by the AND gate 626. The equations implemented by the asynchronous toggle flip-flop 625 are:

$$Q = (I \wedge S') \vee (Q \wedge S') \vee (Q \wedge I') = ((I \vee Q) \wedge S') \vee (Q \wedge I')$$

$$S = (I \wedge S) \vee (Q \wedge S) \vee (Q \wedge I') = ((I \vee Q) \wedge S) \vee (Q \wedge I')$$

The asynchronous reset can be included by inputting negated R into each of the AND gates 624, 626, and 627.

Figure 6F:
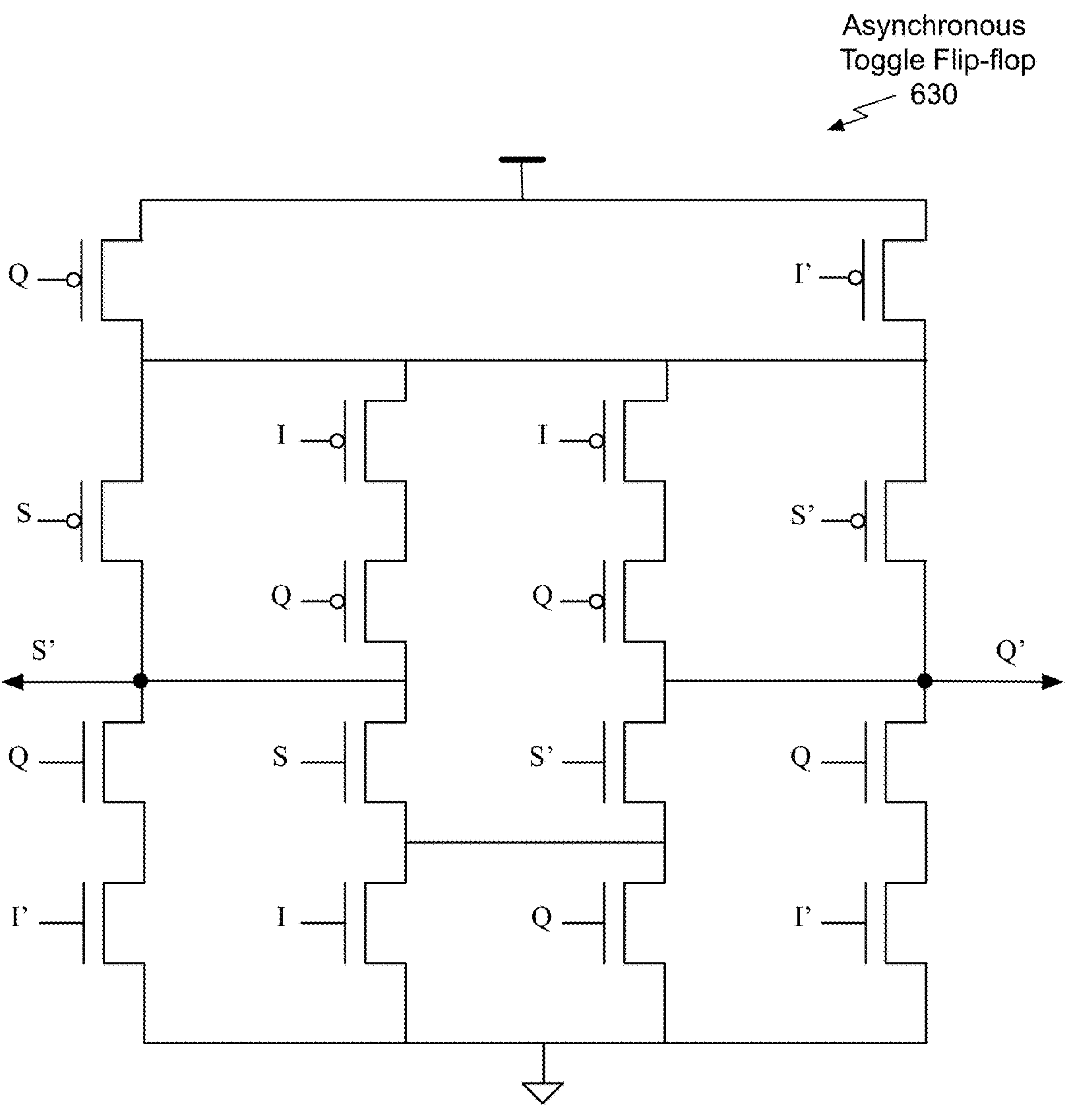
FIG. 6F illustrates a circuit diagram of an asynchronous toggle flip-flop, in accordance with an embodiment.

FIG. 6F illustrates a circuit diagram of an asynchronous toggle flip-flop 630, in accordance with an embodiment. The circuit for the asynchronous toggle flip-flop 630 is an optimized CMOS implementation of the logic diagram for the asynchronous toggle flip-flop 625 shown in FIG. 6E and the equations for Q and S. The circuit shares the pull-up network for the $(Q \wedge I')$ term and the pulldown network for the $(I \vee Q)$ term. By minimizing the number of transistor gates, the circuit for the asynchronous toggle flip-flop 630 minimizes the energy dissipated when each signal I, Q, and S toggles.

In principle, the increment AND gate 601 shown in FIG. 6A can be folded into the circuit for the asynchronous toggle flip-flop 630 by replacing each transistor driven by I or I' with an appropriate two-transistor network (series for pull-down, parallel for pull-up). However, because I and I' appear six times in the circuit, it is more energy efficient to factor out the AND gate so that transitions on the bit selection signals that do not match the accumulator selection input (and vice versa) toggle the gates of only two transistors—rather than six transistors.

Referring back to FIG. 6A, carry signals ripple from bit-to-bit through each flip-flop 605 in the asynchronous accumulator 600. In the worst case, a bit may ripple the entire length of the asynchronous accumulator 600 with a delay of three or four gates per bit. If an increment signal is asserted for one of the flip-flops 605 while a previous increment is still rippling, it is possible that the two toggle flip-flops 620 within an asynchronous accumulator cell 615 (e.g., flip-flop 605) may toggle simultaneously. When both toggle flip-flops 620 within the same asynchronous accumulator cell 615 toggle simultaneously, the resulting two output transitions cancel each other, effectively causing two increments to be lost. The problem can be remedied by replacing the exclusive-OR gate in the asynchronous accumulator cell 615 with an asynchronous sequential circuit that preserves transitions with a minimum pulse width.

Such an "edge-preserving" exclusive-OR gate may be constructed with inputs A and B by introducing two auxiliary variables C and D. The auxiliary variable C follows A after a transition triggered by A. Similarly, the auxiliary variable D follows B after a transition triggered by B. A simultaneous transition on A and B results in two output transitions. Using trajectory maps, the equations of the edge-preserving exclusive-OR gate circuit are:

$$Q = (C' \wedge D' \wedge (A \vee B)) \vee ((C \vee D') \wedge A \wedge B') \vee ((C' \vee D) \wedge A' \wedge B) \vee (C \wedge D \wedge (B' \vee A'))$$

$$C = (C \wedge A) \vee (Q \wedge D' \wedge (A \vee C)) \vee (Q' \wedge D \wedge (B \vee C))$$

$$D = (D \wedge B) \vee (Q \wedge C' \wedge (B \vee D)) \vee (Q' \wedge C \wedge (A \vee D))$$

The edge-preserving exclusive-OR gate circuit has 36 inputs, resulting in a circuit that is larger than the asynchronous toggle flip-flop 630. Therefore, a more efficient option may be to use a conventional exclusive-OR gate circuit and ensure the timing minimizes simultaneous toggling of both toggle flip-flops 620 within the same asynchronous accumulator cell 615. Assuming the bit selection signals to the asynchronous accumulators 600 are gated by a falling edge of the clock, any $C_{in}$ toggling triggered by the inc input to the asynchronous flip-flop 605 has an entire clock cycle to propagate before the next bit selection signal assertion.

Note that the $C_{in}$ toggling only needs to ripple beyond the range within the asynchronous accumulator 600 affected by the inc signal before the next increment (assertion of a bit selection signal). In other words, the $C_{in}$ toggling only needs to ripple beyond bit t−1 of the partial sum output by the asynchronous accumulator 600. The $C_{in}$ toggling can continue to propagate across MSBs of the partial sums produced by the asynchronous accumulators 600 using only the second toggle flip-flop 620 within the asynchronous accumulator cell 615 while the next increment occurs. In an embodiment, waiting an extra clock or two at the end of the calculation for propagation across the MSBs to complete before reading the asynchronous accumulators 600 ensures the accumulation calculation is finished.

Figure 6G:
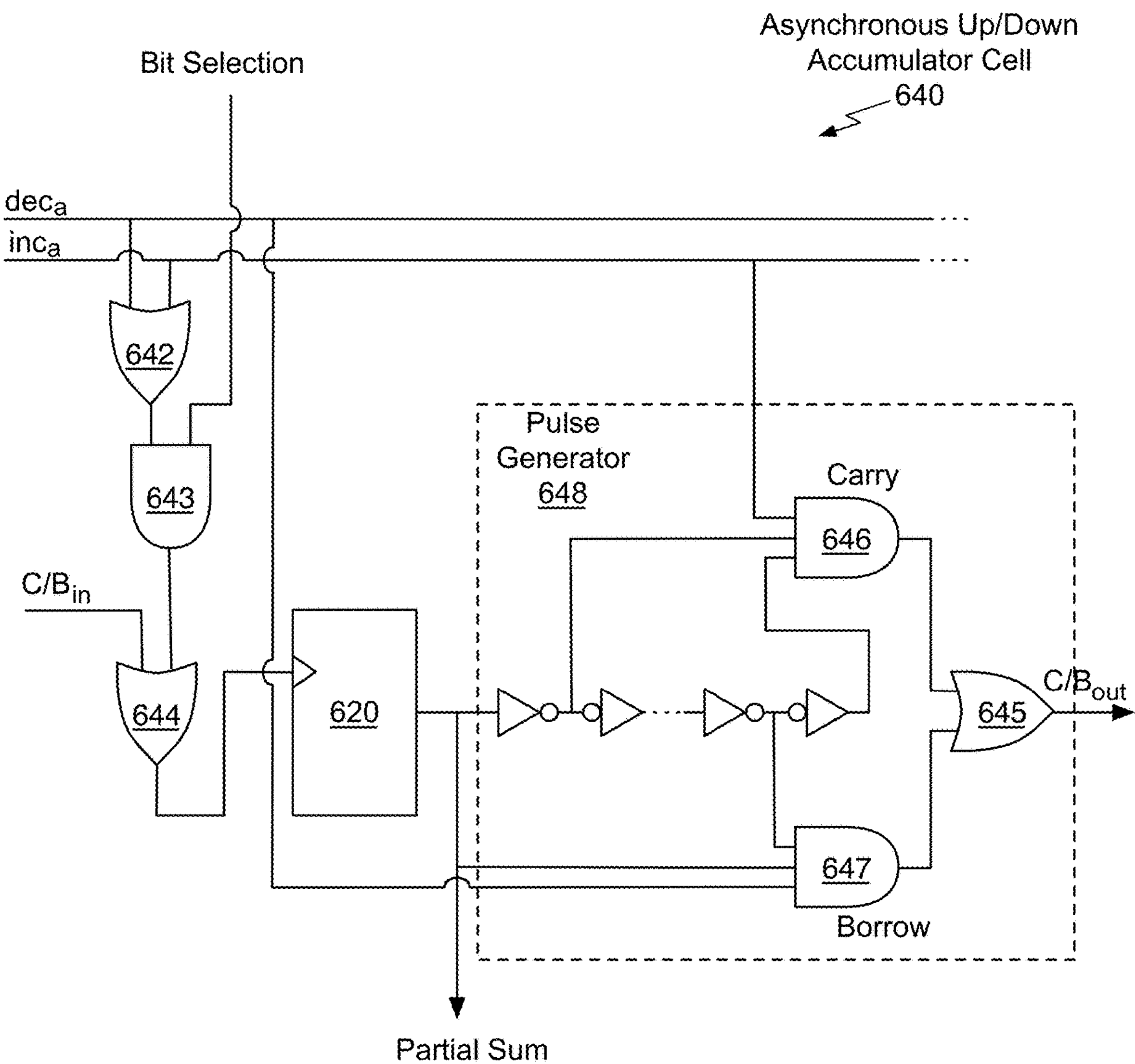
FIG. 6G illustrates a diagram of an asynchronous up/down accumulator cell, in accordance with an embodiment.

FIG. 6G illustrates a diagram of an asynchronous up/down accumulator cell 640, in accordance with an embodiment. The asynchronous up/down accumulator cell 640 may replace the AND gate 601 and asynchronous accumulator cell 615 within the asynchronous accumulator 600. When the input components are signed, the sign bit is combined with the accumulator selection signal to generate signals $inc_a$ and $dec_a$, so that one of $inc_a$ and $dec_a$ is asserted when the accumulator selection specifies the particular asynchronous accumulator. An OR gate 642 combines the bit selection, $inc_a$ and $dec_a$, asserting an input to AND gate 643 for both increment and decrement operations. The OR gate 642 may be shared by all of the asynchronous up/down accumulator cells 640 within the same asynchronous accumulator 600.

The output of the OR gate 642 is combined with the bit selection input to an AND-OR gate implemented by the AND gate 643 and the OR gate 644. An output of the AND-OR gate generates a toggle input to the toggle flip-flop 620. The toggle input transitions low-to-high when the bit is selected for either an increment or decrement operation or when a carry-borrow input ($C/B_{in}$) transitions low-to-high. The Q output of the toggle flip-flop 620 provides the partial sum output. The Q output of the toggle flip-flop 620 is also input to a pulse generation circuit 648 that determines if either a carry or a borrow operation is necessary.

When $inc_a$ is asserted and the partial sum transitions from high-to-low, the pulse generation circuit 648 propagates a carry-out ($C_{out}$) to the next higher asynchronous up/down accumulator cell 640 carry-borrow input ($C/B_{in}$). When $dec_a$ is asserted and the partial sum transitions from low-to-high, the pulse generation circuit 648 propagates a borrow ($B_{out}$) to the next higher asynchronous up/down accumulator cell 640 carry-borrow input ($C/B_{in}$).

Within the pulse generation circuit 648 an AND gate 646 generates a carry input to an OR gate 645 and an AND gate 647 generates a borrow input to the OR gate 645. The carry and borrow may propagate asynchronously through one or more of the asynchronous up/down accumulator cells 640. The Q outputs of the toggle flip-flops 620 for the b asynchronous up/down accumulator cells 640 in the asynchronous accumulator provide the partial sum output.

Figure 6H:
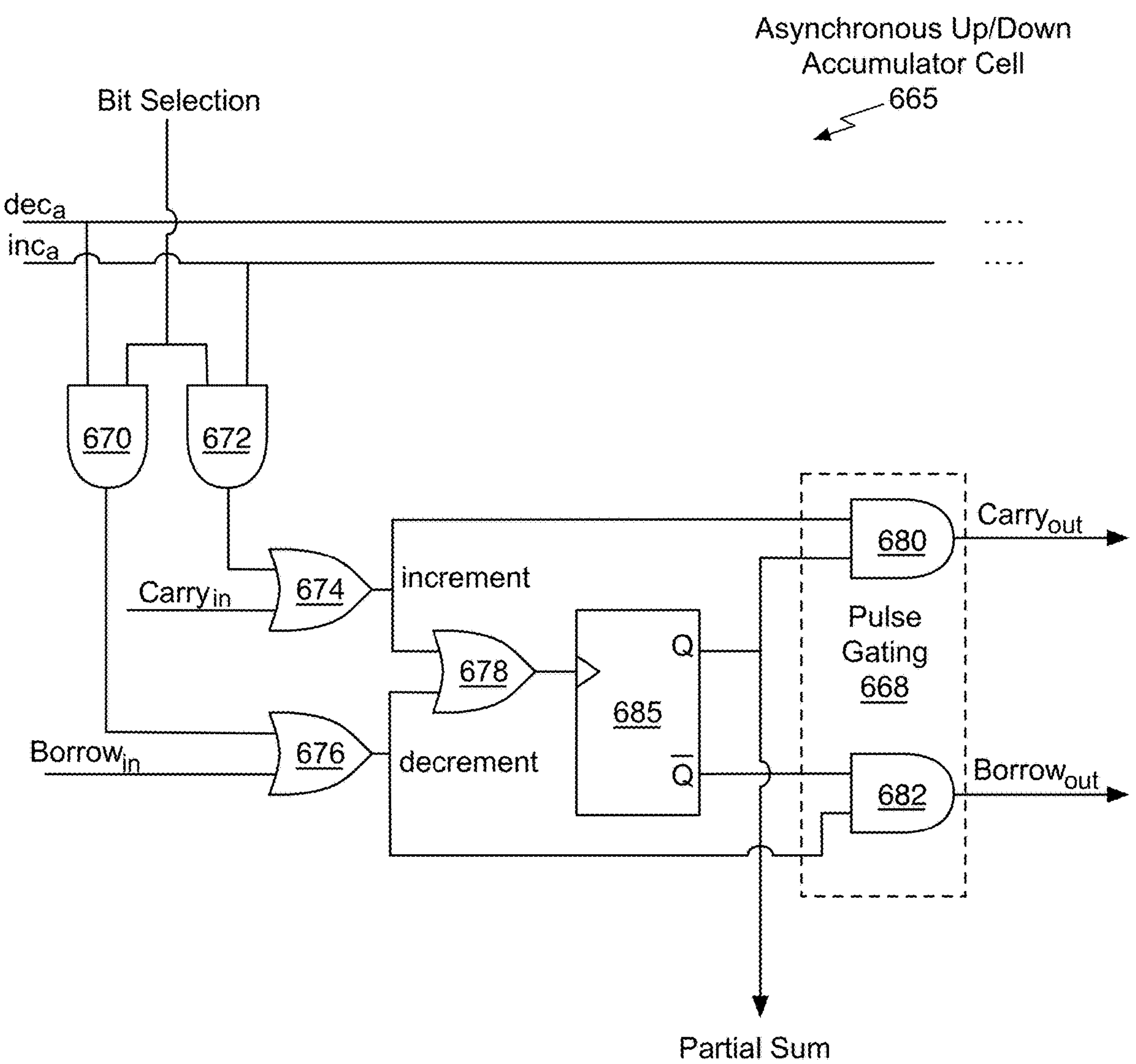
FIG. 6H illustrates a diagram of another asynchronous up/down accumulator cell, in accordance with an embodiment.

FIG. 6H illustrates a diagram of an asynchronous up/down accumulator cell 665, in accordance with an embodiment. The asynchronous up/down accumulator cell 665 may replace the AND gate 601 and asynchronous accumulator cell 615 within the asynchronous accumulator 600. When the input components are signed, the sign bit is combined with the accumulator selection signal to generate signals $inc_a$ and $dec_a$, so that one of $inc_a$ and $dec_a$ is asserted when the accumulator selection specifies the particular asynchronous accumulator. AND gates 670 and 672 combine the bit selection, $inc_a$ and $dec_a$, asserting an input to OR gates 674 and 676 for increment and decrement operations, respectively.

The output of the AND gate 672 is combined with the Carry input ($Carry_{in}$) to the OR gate 674 so that an increment signal is generated by the OR gate 674. The output of the AND gate 670 is combined with the Borrow input ($Borrow_{in}$) to the OR gate 676 so that a decrement signal is generated by the OR gate 676. An output of an OR gate 678 generates a toggle input to a toggle flip-flop 685 when either one of the increment or the decrement signal is asserted. The toggle flip-flop 685 functions in the same manner as the toggle flip-flop 620 with an additional output, $\overline{Q}$ that is the inverse of the output Q. Specifically, the output signal Q transitions once (either rising or falling) for each rising transition of the input. The Q output of the toggle flip-flop 685 provides the partial sum output. The Q and $\overline{Q}$ outputs of the toggle flip-flop 620 are also input to a pulse gating circuit 668 that determines if either a carry or a borrow operation is necessary.

When increment is asserted and the partial sum transitions from high-to-low, an AND gate 680 within the pulse gating circuit 668 propagates a carry output ($Carry_{out}$) to the next higher asynchronous up/down accumulator cell 665. When decrement is asserted and the partial sum transitions from low-to-high, an AND gate 682 the pulse gating circuit 668 propagates a borrow output ($Borrow_{out}$) to the next higher asynchronous up/down accumulator cell 665.

The carry and borrow may propagate asynchronously through one or more of the asynchronous up/down accumulator cells 665. The Q outputs of the toggle flip-flops 665 for the b asynchronous up/down accumulator cells 665 in the asynchronous accumulator provide the partial sum output. Note that compared with the asynchronous up/down accumulator cell 640, the asynchronous up/down accumulator cell 665 the propagation of carry/borrow signals involves only two gate delays per bit; specifically, the OR gate 674 and the AND gate 680 for carry propagation and the OR gate 676 and the AND gate 682 for borrow propagation.

Accumulating by incrementing or decrementing a single bit position of an asynchronous accumulator, such as the asynchronous accumulator 600 reduces energy consumed compared with using a conventional synchronous accumulator. The asynchronous accumulator generating a b bit output may be efficiently implemented using b accumulator cells, such as the asynchronous accumulator cell 615 that comprises a pair of toggle flip-flops 620 and an XOR gate. The output bit for accumulator cell $j-1$ is the carry input for accumulator cell j. An alternative embodiment, such as the asynchronous up/down accumulator cell 640 comprises a single toggle flip-flop 620 and a pulse-generating circuit for generating carry and borrow signal transitions.

Multiple asynchronous accumulators 600 may be configured in an array to compute partial sums for logarithmic addition of values including an integer component and a remainder component. An accumulator selection controls which asynchronous accumulator 600 in the array is incremented (or decremented). Each accumulator selection corresponds to a different fractional value (remainder $e_r$). The bit of the asynchronous accumulator that is incremented, is determined based on the integer component (quotient $e_q$).

Inference Accelerator

The partial sums generation unit 105 using logarithmic arithmetic shown in FIG. 1A, implemented using asynchronous accumulators 600, may be used to produce a very low-power inference accelerator. Weights and input activations in logarithmic format are "multiplied" via addition to produce product values (partial output activations) that are input to the partial sums generation unit 105. Each product value includes an integer portion (quotient component) and fractional portion (remainder component) that are separated by a binary point.

Figure 7A:
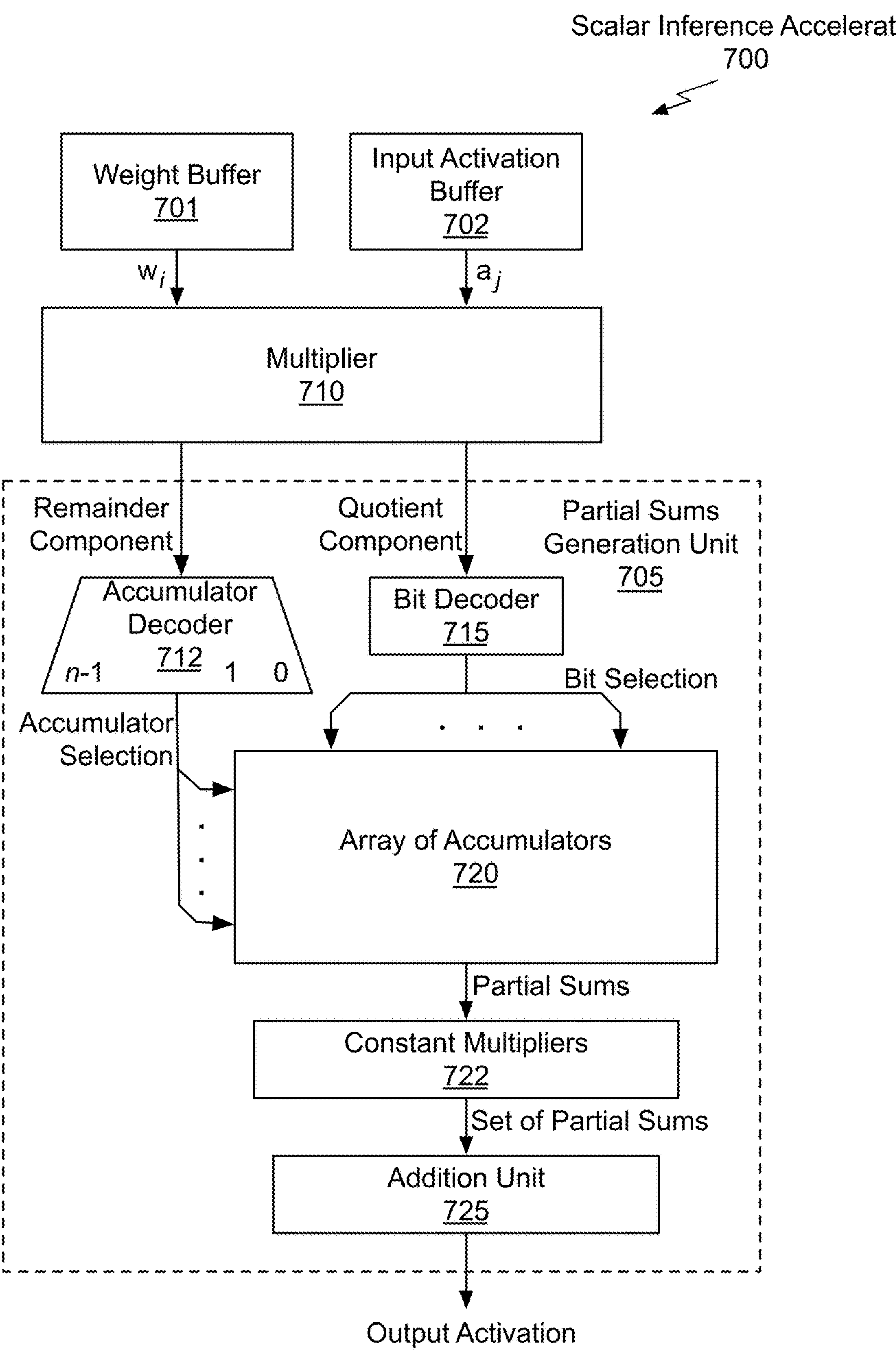
FIG. 7A illustrates a block diagram of a scalar inference accelerator, in accordance with an embodiment.

FIG. 7A illustrates a block diagram of a scalar inference accelerator 700, in accordance with an embodiment. The scalar inference accelerator 700 includes a weight buffer 701, an input activation buffer 702, a multiplier 710, and a partial sums generation unit 705. The weight buffer 701 stores weight values $w_i$ in logarithmic form. The input activation buffer 702 stores input activation values $a_j$ in logarithmic form. In an embodiment, values are stored to the weight buffer 701 and input activation buffer 702 by the LSU 554 within the SM 440.

Each clock cycle, one weight value and one input activation value are input to the multiplier 710 to produce a product value in logarithmic form. The multiplier 710 simply adds the two inputs to produce a product value that is a partial output activation of a convolution operation. The product value has a first number of bits to the left of the binary point (integer or quotient component) and a second number of bits to the right of the binary point (fractional or remainder component). As previously explained, decomposing each product value in the logarithmic format into a quotient component $e_q$ and a remainder component e, enables an inexpensive conversion of the product values to an integer representation for accumulation to compute the sum of a series of numbers. The remainder component and quotient component for each product value are input to the partial sums generation unit 705. The partial sums generation unit 705 sums a series of the product values and generates a result. In an embodiment, the result is an output activation value.

The partial sums generation unit 705 includes an accumulator decoder 712, a bit decoder 715, an array of accumulators 720, constant multipliers 722, and an addition unit 725. The accumulator decoder 712 decodes the remainder component, generating the accumulator selection signal to select the asynchronous accumulator 600 within the array of accumulators 720 to be incremented or decremented. The bit decoder 715 decodes the quotient component to select the bit of the asynchronous accumulator 600 to increment or decrement. In an embodiment, the bit decoder 715 generates the bit selection signal by left shifting a one by the number of bit positions equal to the quotient component (e.g., 1<<quotient component).

An enable signal (not shown) may be used to gate the accumulator decoder 712 and the bit decoder 715 on after both the remainder component and quotient component are stabilized and only if the product output by the multiplier 710 is valid. In an embodiment, a gated and inverted version of the clock is used for the enable signal.

The array of accumulators 720 includes one asynchronous accumulator for each possible remainder component value to generate the partial sums. The AND gates 601 within each asynchronous accumulator 600 combines one bit of the accumulator selection with each one of the bit selection bits to select a particular bit of a particular asynchronous accumulator 600 to increment. For each logical accumulator, there are n physical asynchronous accumulators 600—one for each possible remainder component value.

The constant multipliers 722 scale the partial sums for each possible remainder component value by the specific remainder component value corresponding to the partial sum to produce a set of partial sums. The set of partial sums comprises n partial sums, one for each possible remainder component value. The constant multipliers 722 perform the same operation as the multipliers 122 and the addition unit 725 performs the same operation as the addition unit 125. The addition unit 725 adds the partial sums in the set of partial sums to produce the result (output activation). In an embodiment, the conversion unit 130 may be included in the scalar inference accelerator 700 to convert the result into a logarithmic form.

One product is generated by the multiplier 710 each clock cycle and the scalar inference accelerator 700 efficiently accumulates the one product with other products in the asynchronous array of accumulators 720. When all of the products have been input to the partial sums generation unit 705, the partial sums are scaled by the constants and the set of partial sums are added together to produce the result. Performance may be increased by computing N partial output activations (products of a single activation and N weights) in parallel to implement a vector inference accelerator including N arrays of asynchronous accumulators, such as N arrays of accumulators 720.

Figure 7B:
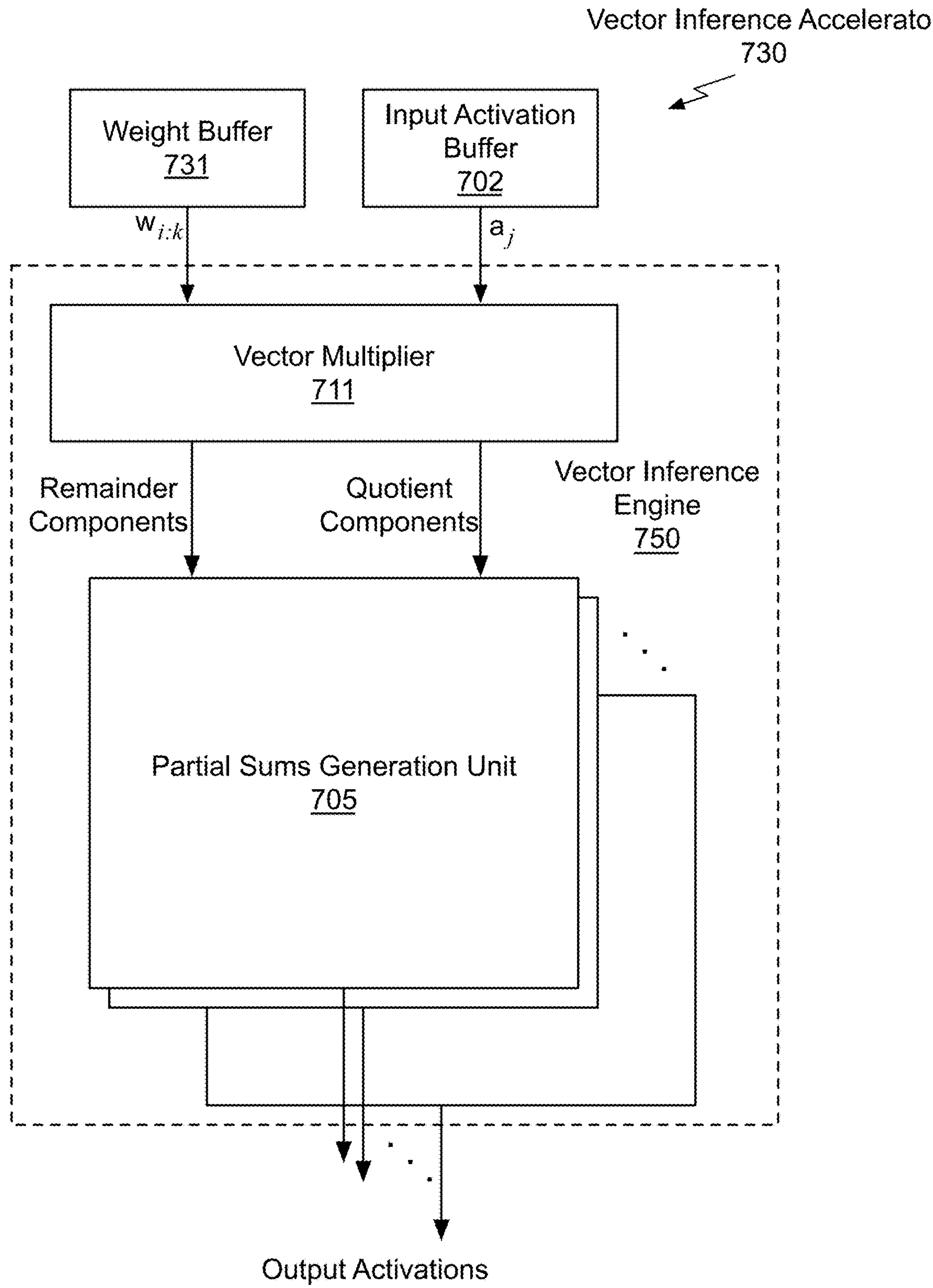
FIG. 7B illustrates a block diagram of a vector inference accelerator, in accordance with an embodiment.

FIG. 7B illustrates a block diagram of a vector inference accelerator 730, in accordance with an embodiment. The vector inference accelerator 730 includes a weight buffer 731, the input activation buffer 702, and a vector inference engine 750. The vector inference engine 750 includes a vector multiplier 711 and N partial sums generation units 705, where the N partial sums generation unit 705 comprise an instance. The weight buffer 721 stores weight values $w_{i:k}$ in logarithmic form. In an embodiment, values are stored to the weight buffer 731 by the LSU 554 within the SM 440.

The vector inference accelerator 730 provides higher throughput compared with the scalar inference accelerator 700. In an embodiment, the vector multiplier 711 multiplies a vector of N weights by a single activation. In an embodiment, N is 8 or 16 and a total of V products are computed by the vector multiplier 711 where a portion (e.g., N) of the V products are computed each clock cycle. Each clock cycle N weights $w_{i:k}$ are read from the weight buffer 731 and a single activation $a_j$ is read from the input activation buffer 702. In an embodiment, the vector multiplier 711 comprises an array of adders to multiply each weight by the activation, producing an array of product values. The N accumulator decoders 712 and the N bit decoders 715 within the partial sums generation units 705 decodes the quotient component of each partial output to select one of the asynchronous accumulators 600 within each array of accumulators 720 and the remainder component of each partial output to select a bit of the asynchronous accumulators 600, respectively.

As described, each clock cycle N weights are multiplied by a single activation. The weights are temporally reused—staying stationary over M clock cycles as different activations are read from the input activation buffer 702. For each of the M clock cycles, the N separate arrays of accumulators 720 are updated. Furthermore, persons of ordinary skill in the art will understand that different mappings of the inference calculation can result in variations on the arrangement. In a first variation, a single weight is multiplied by N activations. In second variation, N weights and N activations are read and a single array of accumulators 720 is updated. In the second variation, the bit selections for the same asynchronous accumulator 600 are combined, so that two increments to the same bit, increment the next most significant bit and so on. In some embodiments, a logical accumulator will be duplicated in several or all of the arrays of accumulators 720 within the vector inference engine 750. Additional energy can be saved by combining the partial sums for the same logical accumulator with an adder tree before scaling the partial sum by a constant. Processing performance can be further improved by using multiple vector inference engines 750 to increase parallelism.

Figure 7C:
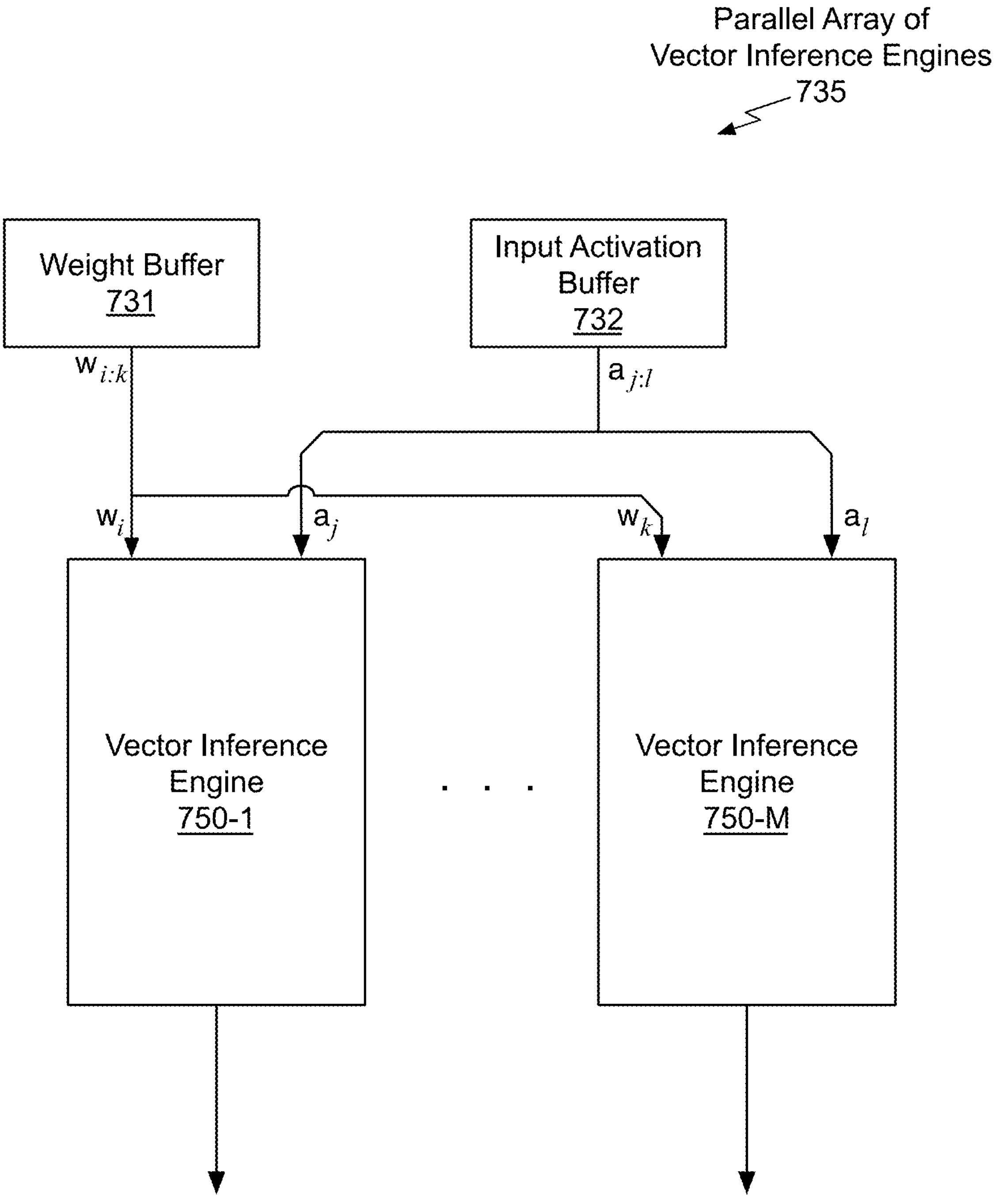
FIG. 7C illustrates a block diagram of a parallel array of vector inference engines, in accordance with an embodiment.

FIG. 7C illustrates a block diagram of a parallel array of vector inference engines 750, in accordance with an embodiment. Additional throughput can be achieved by using multiple parallel copies (or lanes) of the vector inference engine 750 fed by a single weight buffer 731 and input activation buffer 732. In an embodiment, N weights are read from the weight buffer 731 each clock cycle and broadcast to all M vector inference engines 750 and M activations are read from the input activation buffer 732 each cycle with one distributed to each one of the vector inference engines 750. The N weights may be reused temporally by holding the weights at the inputs to the vector inference engines 750 for several clock cycles while different activations are read from the input activation buffer 732. The vector inference engines 750 multiply the N weights by the M activations and accumulate the product values using multiple separate arrays of accumulators 720 in each vector inference engine 750. In an embodiment, M is 8 or 16. When Nis 8 or 16, M of 8 or 16 provides 64 to 256 multiply-accumulate operations per clock cycle.

In an embodiment, N activations are read from the input activation buffer 732 each clock cycle and broadcast to all M vector inference engines 750 and M weights are read from the weight buffer 731 each cycle with one distributed to each one of the vector inference engines 750. The N activations may be reused temporally by holding the activations at the inputs to the vector inference engines 750 for several clock cycles while different weights are read from the weight buffer 731. The vector inference engines 750 multiply the N activations by the M weights and accumulate the product values using multiple separate arrays of accumulators 720 in each vector inference engine 750.

As with the vector inference accelerator 730, many mappings of the inference calculation are possible using the parallel configuration of the vector inference engines 750. Some of the mappings may result in multiple copies of a single logical accumulator across the parallel vector inference engines 750, across the partial sums generation units 705 within a vector inference engine 750, or both. As with the vector inference accelerator 730, additional energy can be saved by combining the partial sums for the same logical accumulator with an adder tree before scaling the partial sum by a constant.

Yet more parallelism can be achieved by combining multiple processing elements (PEs), where each PE includes the parallel array of vector inference engines 735 with logarithmic data representation and the asynchronous accumulators 600. A grid of PEs may be connected by a network on chip (NoC) to implement an inference device.

Figure 7D:
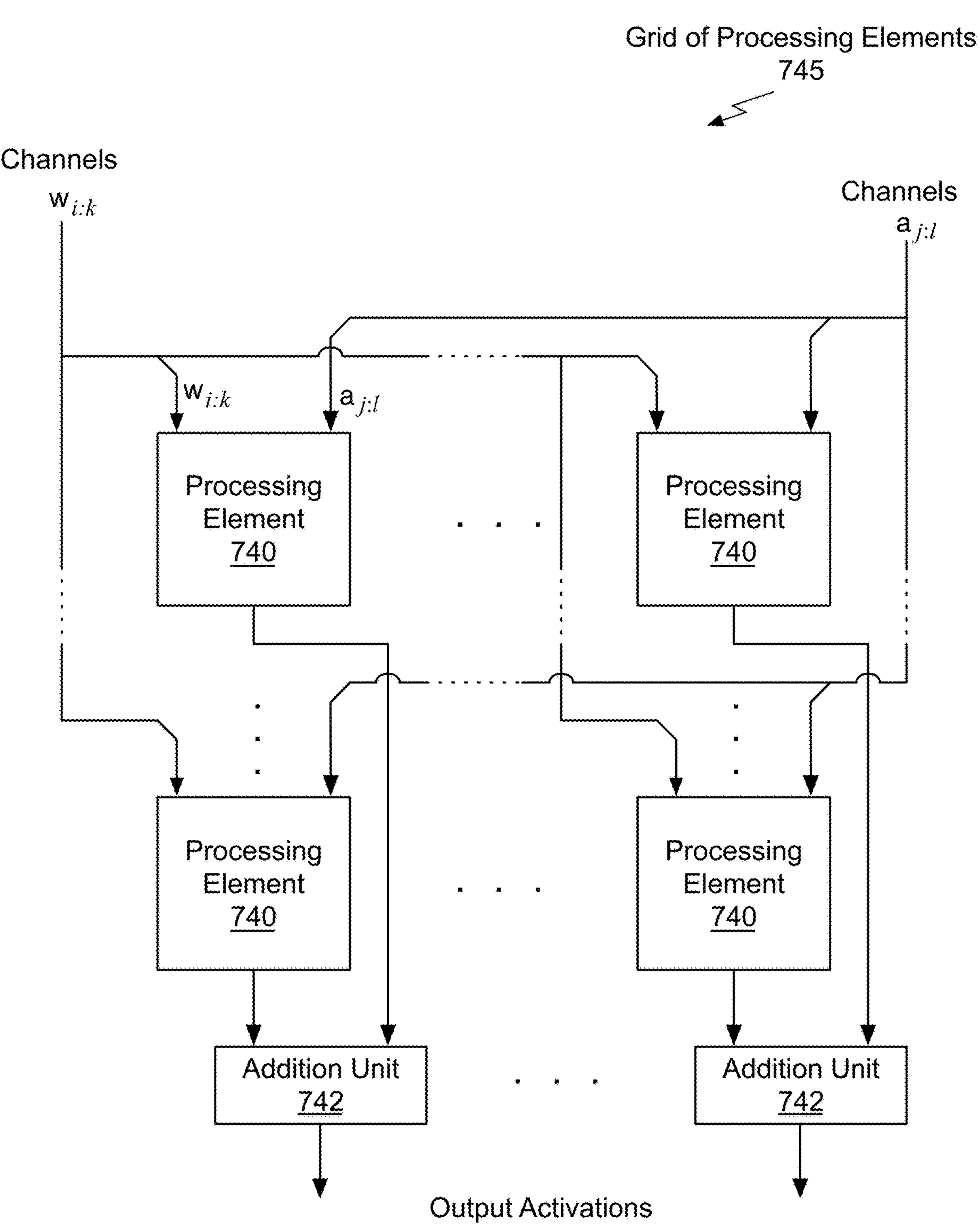
FIG. 7D illustrates a block diagram of a grid of processing elements, in accordance with an embodiment.

FIG. 7D illustrates a block diagram of a grid of processing elements 745, in accordance with an embodiment. In one embodiment the inference problem is mapped to the array of PEs 740 by dividing the input channels $w_{i:k}$ and $a_{j:l}$ across the rows of the grid and the output channels across the columns of the grid.

The input activations $a_{j:l}$ are distributed across each row by the NoC and partial output activations are summed down the columns by addition units 742 using the NoC for communication to produce the output activations. In an embodiment, addition units 742 are included to sum each column of partial output activations generated by the PEs 740 starting at the second row of PEs 740. In an embodiment, the array of PEs 740 is 4×4 with each PE 740 including 16 vector inference engines 750 (M=16) with a vector length of 16, producing a total of 4,096 MACs per clock cycle (8,192 MOPs/cycle), which, at a frequency of 1 GHz provides 8TOPS of performance. Persons of ordinary skill in the art will understand that larger grids can be implemented to provide higher performance. In an embodiment, multiple chips, each of which contains a grid of processing elements 745, can be combined on an MCM.

Figure 7E:
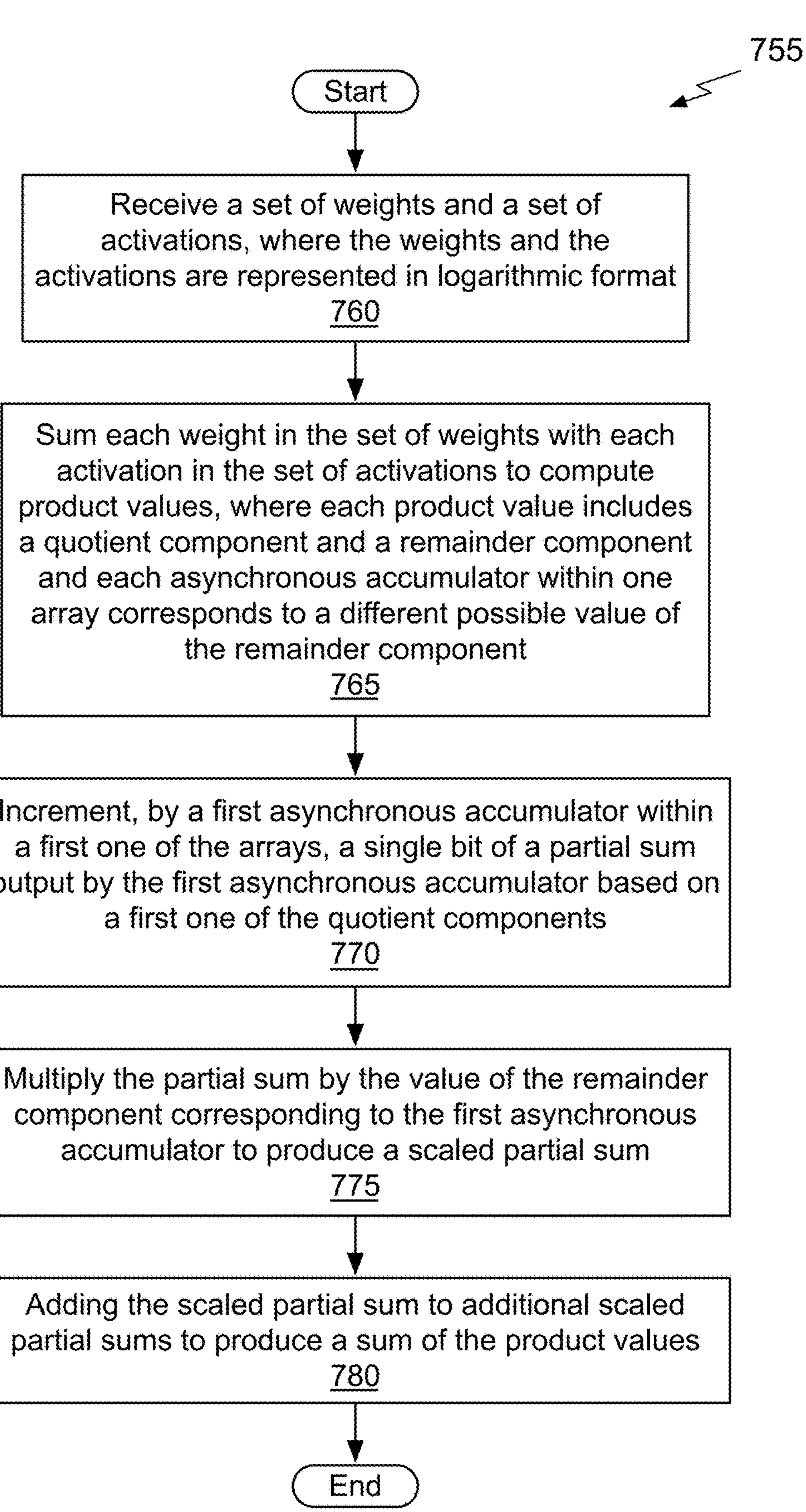
FIG. 7E illustrates a flowchart of a method for computing a sum of product values using an array of asynchronous accumulators, in accordance with an embodiment.

FIG. 7E illustrates a flowchart of a method 755 for computing a sum of product values using an array of asynchronous accumulators 600, in accordance with an embodiment. Although method 755 is described in the context of a processing unit, the method 755 may also be performed by a program, custom circuitry, or by a combination of custom circuitry and a program. For example, the method 755 may be executed by a GPU, CPU, or any processor capable of computing a sum of input values in logarithmic format using an asynchronous accumulator. Furthermore, persons of ordinary skill in the art will understand that any system that performs method 755 is within the scope and spirit of embodiments of the present disclosure.

At step 760, a set of weights and a set of activations are received, where the weights and the activations are represented in logarithmic form. In an embodiment, the set of weights is stored in the weight buffer 701 or 731. In an embodiment, the set of activations is stored in the input activation buffer 702. At step 765, each weight in the set of weights is summed with each activation in the set of activations to compute product values. Each product value includes a quotient component and a remainder component. Each asynchronous accumulator, such as the asynchronous accumulator 600, within one array of the asynchronous accumulators 720 corresponds to a different possible value of the remainder component.

At step 770, a first asynchronous accumulator 600 within a first one of the arrays increments or decrements a single bit of a partial sum output by the first asynchronous accumulator 600 based on a first one of the quotient components. In an embodiment, the quotient component determines the single bit that is incremented or decremented. In an embodiment, the first asynchronous accumulator 600 is corresponds to the remainder component. In an embodiment, the product values include a sign, and asynchronous accumulators 600 within the array of accumulators 720 are implemented using the asynchronous up/down accumulator cell 640. In an embodiment, a positive sign corresponds to an increment input, and a negative sign corresponds to a decrement input.

In an embodiment, the product values include a sign, and asynchronous accumulators 600 are implemented as pairs using the asynchronous accumulator cell 615, where a first asynchronous accumulator 600 in each pair is incremented for positive product values and a second asynchronous accumulator 600 in each pair is incremented for negative product values. The negative and positive partial sums in each pair are combined by subtracting the negative partial sums from the positive partial sums before the combined partial sum is scaled by the remainder component using the constant multipliers 722.

At step 775, the partial sum is multiplied by the value of the remainder component corresponding to the first asynchronous accumulator 600 to produce a scaled partial sum. In an embodiment, the partial sum is multiplied by the constant multipliers 722. In an embodiment, when two or more asynchronous accumulators 600 in different arrays of accumulators 720 correspond to the same remainder component, the partial sums generated by the two or more asynchronous accumulators 600 may be summed before the resulting partial sum is multiplied by the constant multiplier 722.

At step 780, the scaled partial sum is added to additional scaled partial sums by the addition unit 725 to produce a sum of the product values in integer form. When the partial sums generation unit 705 is included within vector inference engine 750, the sum of the partial sums output by each of the partial sums generation units 705 are summed by an adder tree and/or the addition unit 742 to produce the output activations.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A processing element, comprising:
- a set of M vector inference engines, each vector inference engine comprising:
  - a vector adder configured to compute product values by summing each weight in a set of weights with each activation in a set of activations, wherein the weights and the activations are represented in logarithmic form, each product value including a quotient component and a remainder component;
  - N arrays of asynchronous accumulators, wherein, within each one of the N arrays:
    - each asynchronous accumulator corresponds to a different possible value of the remainder component and is configured to increment or decrement a single bit of a partial sum based on the quotient component; and
    - a scale unit coupled to each asynchronous accumulator multiplies the partial sum by the value of the remainder component corresponding to the asynchronous accumulator to produce a scaled partial sum; and
    - an addition unit adds the scaled partial sums to produce a sum of the product values.

2. The processing element of claim 1, wherein the set of activations includes M activations and a different one of the M activations are input to each one of the M vector inference engines and the N weights are broadcast to the N arrays within each one of the vector inference engines.

3. The processing element of claim 1, wherein an accumulator selection signal is a one-hot encoding of the remainder component and each one of the asynchronous accumulators is associated with a different bit of the accumulator selection signal.

4. The processing element of claim 3, wherein the bit of the accumulator selection signal associated with a first accumulator of the asynchronous accumulators is ANDed with a bit selection signal.

5. The processing element of claim 4, wherein the bit selection signal is generated as a one-hot encoding of the quotient component.

6. The processing element of claim 1, wherein the asynchronous accumulators comprise asynchronous up/down accumulator cells.

7. The processing element of claim 6, wherein carry and borrow signals propagate asynchronously through one or more of the asynchronous up/down accumulator cells.

8. The processing element of claim 1, wherein the sum comprises image data that are input to at least one layer of a neural network model within a processor.

9. The processing element of claim 1, wherein the vector inference engine computes a dot product for a deep learning system.

10. The processing element of claim 1, further comprising using the sum within at least one of an autonomous vehicle platform, financial modeling system, robotics system, speech recognition system, text recognition system, image recognition system, weather forecasting system, video analytics system, molecular simulation system, disease diagnosis system, data analytics system, molecular dynamics simulation system, factory automation system, real-time language translation system, online search optimization system, or personalized user recommendations system.

11. A system, comprising:
- a memory storing a set of weights represented in logarithmic form and a set of activations represented in logarithmic form; and
- a set of M vector inference engines, each vector inference engine comprising:
  - a vector adder configured to compute product values by summing each weight in the set of weights with each activation in the set of activations, wherein each product value includes a quotient component and a remainder component;
  - N arrays of asynchronous accumulators, wherein, within each one of the N arrays:
    - each asynchronous accumulator corresponds to a different possible value of the remainder component and is configured to increment or decrement a single bit of a partial sum based on the quotient component; and
    - a scale unit coupled to each asynchronous accumulator multiplies the partial sum by the value of the remainder component corresponding to the asynchronous accumulator to produce a scaled partial sum; and
    - an addition unit adds the scaled partial sums to produce a sum of the product values.

12. The system of claim 11, wherein the N arrays are configured to compute partial sums of products of N weights and M activations.

13. The system of claim 12, wherein the set of activations includes M activations and a different one of the M activations are input to each one of the M vector inference engines and the N weights are broadcast to the N arrays within each one of the vector inference engines.

14. The system of claim 11, wherein an accumulator selection signal is a one-hot encoding of the remainder component and each one of the asynchronous accumulators is associated with a different bit of the accumulator selection signal.

15. The system of claim 11, wherein the asynchronous accumulators comprise asynchronous up/down accumulator cells.

16. A computer-implemented method for computing a sum of product values using N arrays of asynchronous accumulators, comprising:

receiving a set of weights and a set of activations by a set of M vector adders within M vector inference engines, wherein the weights and the activations are represented in logarithmic form;

summing each weight in the set of weights with each activation in the set of activations by a first one of the M vector adders to compute product values, wherein each product value includes a sign, a quotient component, and a remainder component and each asynchronous accumulator within one of the N arrays corresponds to a different possible value of the remainder component;

either incrementing or decrementing according to the sign, by a first asynchronous accumulator within a first one of the N arrays, a single bit of a partial sum output by the first asynchronous accumulator based on a first one of the quotient components;

multiplying, by a scale unit coupled to the first asynchronous accumulator, the partial sum by the value of the remainder component corresponding to the first asynchronous accumulator to produce a scaled partial sum; and adding the scaled partial sum to additional scaled partial sums by an addition unit to produce the sum of the product values.

17. The computer-implemented method of claim 16, wherein the N arrays are configured to compute partial sums of products of N weights and M activations.

18. The computer-implemented method of claim 17, wherein the set of activations includes M activations and a different one of the M activations are input to each one of the M vector inference engines and the N weights are broadcast to the N arrays within each one of the vector inference engines.

19. The computer-implemented method of claim 16, wherein an accumulator selection signal is a one-hot encoding of the remainder component and each one of the asynchronous accumulators is associated with a different bit of the accumulator selection signal.

20. The computer-implemented method of claim 16, wherein the asynchronous accumulators comprise asynchronous up/down accumulator cells.

* * * * *